US008244126B2

(12) United States Patent
Eddleston et al.

(10) Patent No.: US 8,244,126 B2
(45) Date of Patent: Aug. 14, 2012

(54) AUTOMATICALLY SELECTING A CLOCK RECOVERY MODE WITHIN OPTICAL NETWORK TERMINALS

(75) Inventors: Charles J. Eddleston, Minneapolis, MN (US); Christopher T. Bernard, Wayzata, MN (US); Jason W. Dove, Novato, CA (US)

(73) Assignee: Calix, Inc., Petaluma, CA (US)

( * ) Notice: Subject to any disclaimer, the term of this patent is extended or adjusted under 35 U.S.C. 154(b) by 788 days.

(21) Appl. No.: 12/327,504

(22) Filed: Dec. 3, 2008

(65) Prior Publication Data

US 2010/0135657 A1      Jun. 3, 2010

(51) Int. Cl.
*H04B 10/08* (2006.01)
*H04B 10/20* (2006.01)

(52) U.S. Cl. .......................... 398/25; 398/155

(58) Field of Classification Search .......... 398/154–155, 398/25
See application file for complete search history.

(56) References Cited

U.S. PATENT DOCUMENTS

| 7,706,693 | B2 * | 4/2010 | Nonaka et al. | 398/155 |
| 7,756,418 | B2 * | 7/2010 | Ofalt et al. | 398/25 |
| 2007/0097902 | A1 | 5/2007 | Aweya et al. | |

FOREIGN PATENT DOCUMENTS

WO      2008/051123 A1      5/2008

OTHER PUBLICATIONS

"Passive Optical Networks Unlocking the Bandwidth Potential of Fiber with Precise Sync," Application Brief, Symmetricom, 2005, 5 pages.

Kunigonis M., "FTTH Explained: Delivering efficient customer bandwidth and enhanced services," Product Line Manager Access, Corning Cable Systems, 2007, 7 pages.
ITU-T Recommendation G.8261/Y.1361, International Telecommunication Union, May 2006, 64 pages.
Stein et al., "White Paper: TDM Timing," RAD Data Communication Ltd., Aug. 2006, 16 pages.
Patent Application entitled "Optical Network Interface Devices and Methods," U.S. Appl. No. 12/121,283, filed May 15, 2008, Biegert et al.
ITU-T Recommendation G.984.3, International Telecommunication Union, Feb. 2004, 116 pages.
Draft G.8264, Telecommunication Standardization Sector, TD 487R1, Feb. 11-22, 2008, 32 pages.
DS341T108 4.2.1, Dallas Semiconductor MAXIM, Rev. 1.0, May 3, 2007, 476 pages.
RFC 3550-RTP: A Transport Protocol for Real-Time Applications, Network Working Group, Jul. 2003, 105 pages.
Application Note, MSAN-198, "Performing Clock Recovery for Circuit Emulation when using the MT90880," Zarlink Semiconductor, Aug. 2002, 9 pages.

* cited by examiner

*Primary Examiner* — Leslie Pascal
(74) *Attorney, Agent, or Firm* — Shumaker & Sieffert, P.A.

(57) ABSTRACT

This disclosure is directed to techniques for facilitating clock recovery in optical networks. An optical network terminal (ONT) that terminates a fiber link of an optical network includes a clock mode selection module that automatically selects a clock recovery mode based on a type of optical network to which the ONT connects and a type of service provided to one or more subscriber devices coupled to the ONT. By automatically selecting the clock recovery module, an administrator or other user need not provision this aspect of the optical network, thereby reducing administrative tasks and facilitating the provisioning of the optical network. In addition, the techniques enable selection of the most optimal clock recovery mode based on the current state of the optical network.

33 Claims, 8 Drawing Sheets

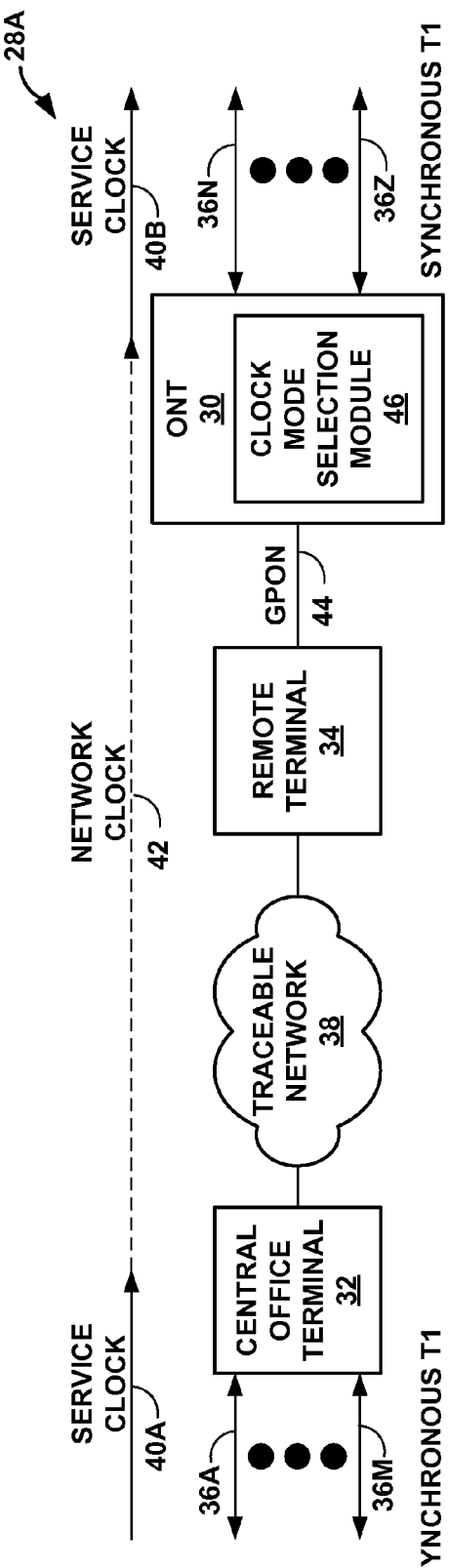
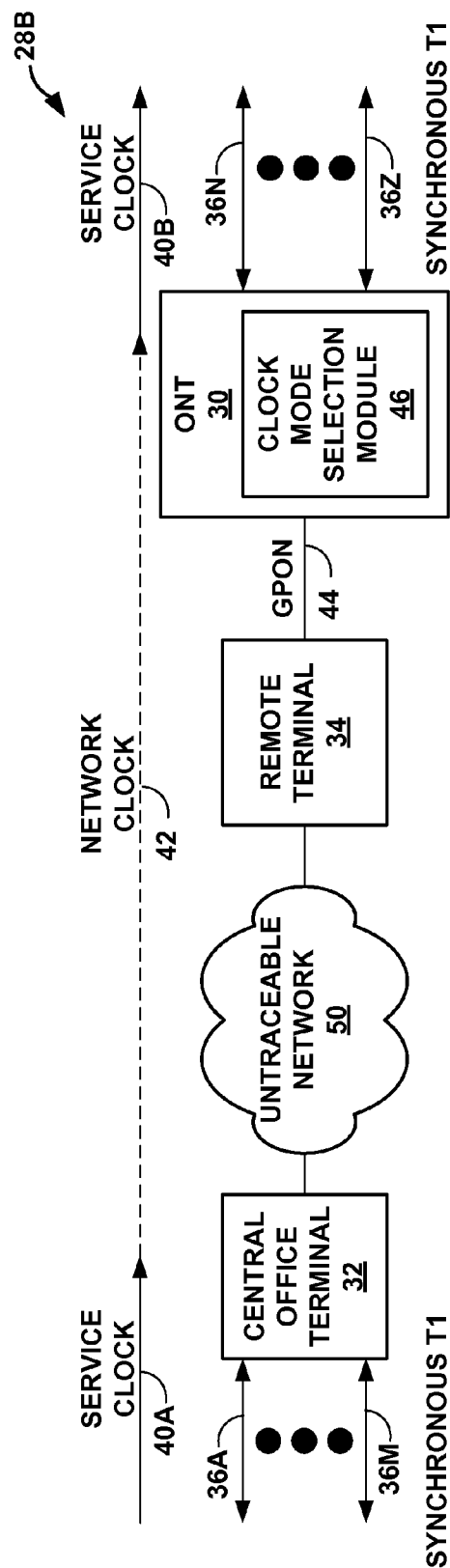
FIG. 2A
FIG. 2B

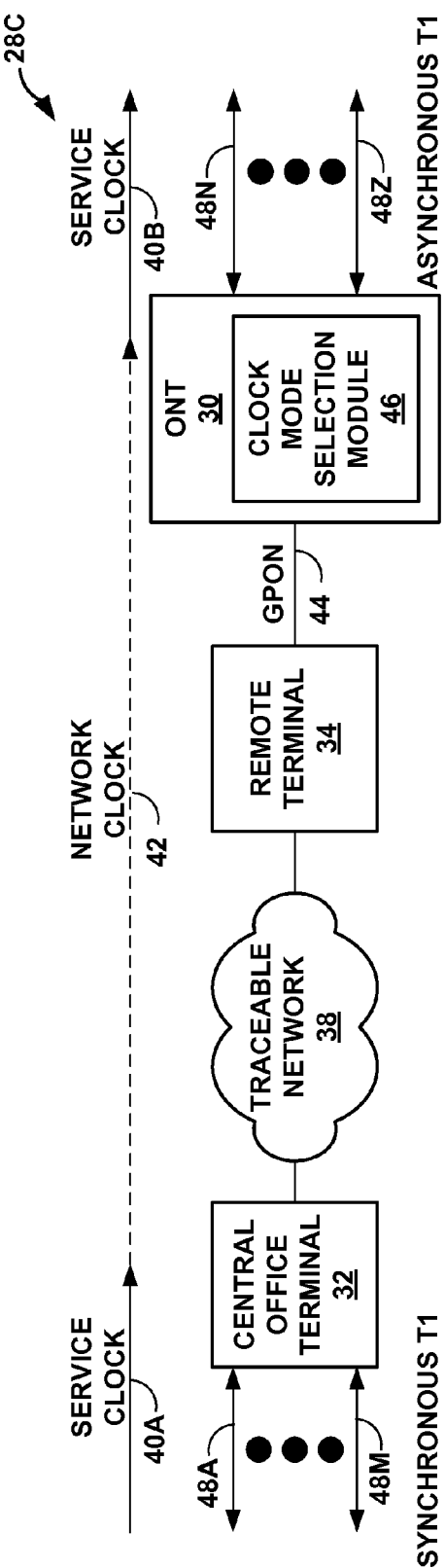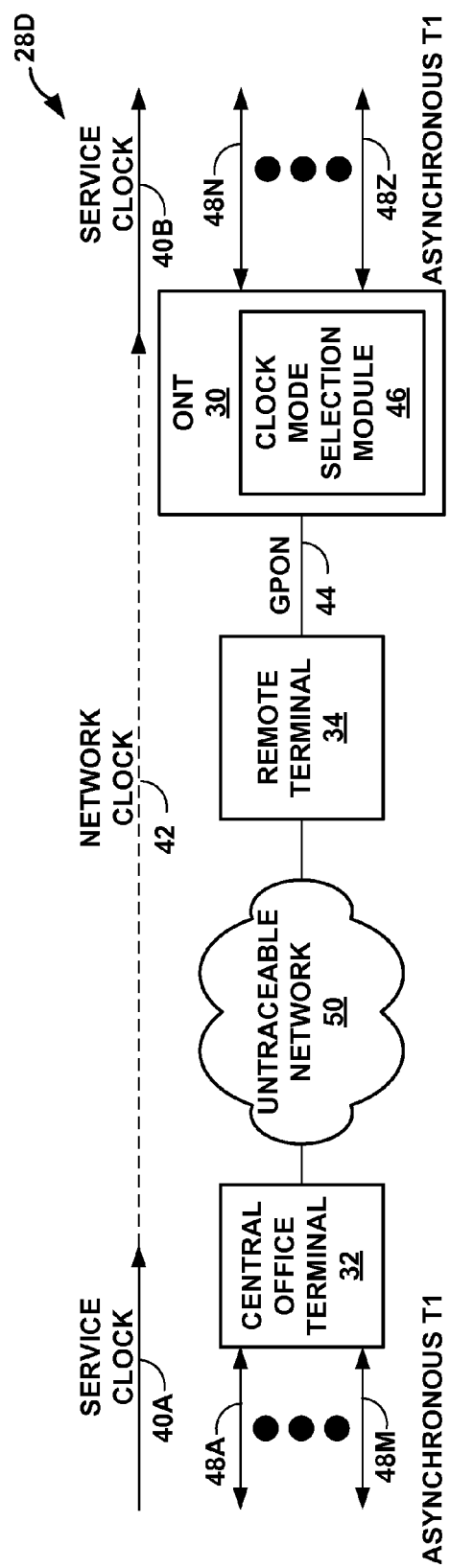

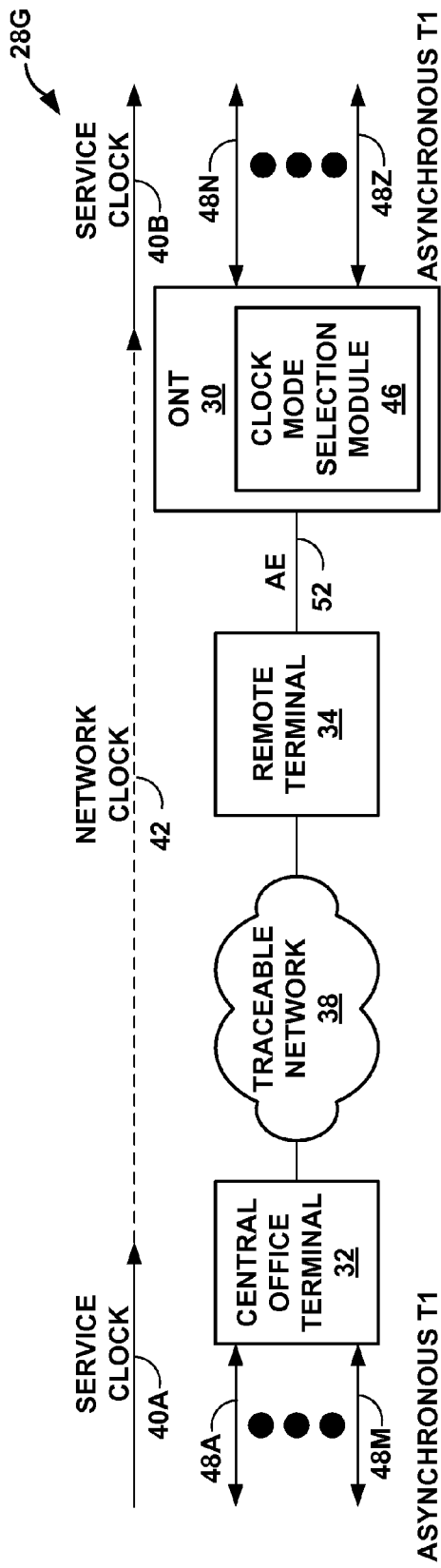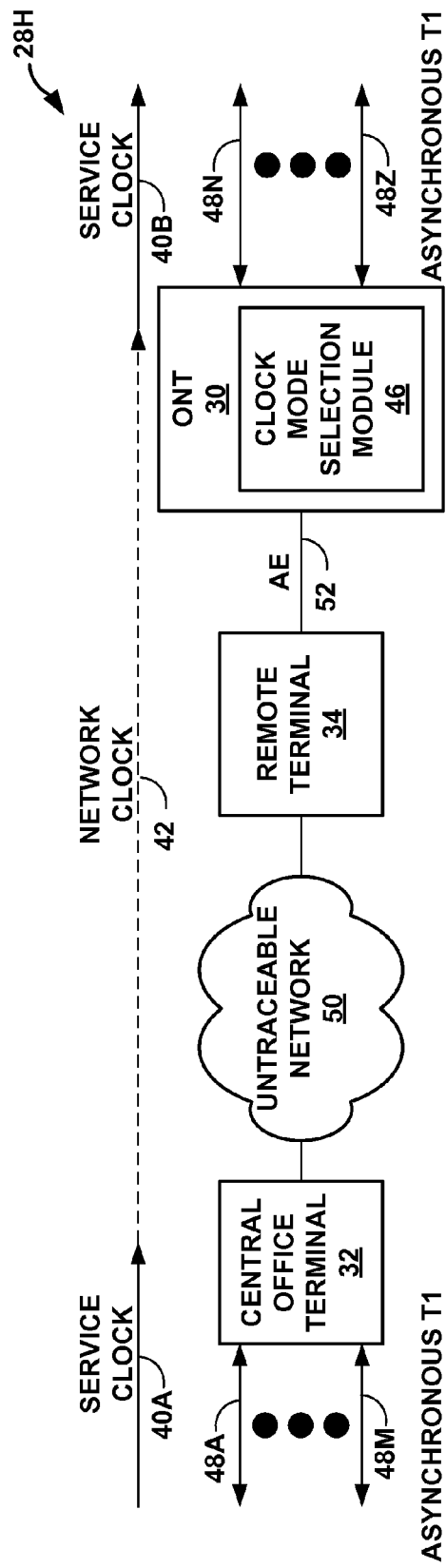

AUTOMATICALLY SELECTING A CLOCK RECOVERY MODE WITHIN OPTICAL NETWORK TERMINALS

TECHNICAL FIELD

This disclosure relates to optical networks and, more particularly, clock recovery within optical networks.

BACKGROUND

Optical networks are used to deliver services to multiple network subscribers using one or more optical fibers. The optical networks deployed to deliver the services may be passive or active. In a passive optical network (PON), for example, passive optical splitters and combiners enable multiple subscribers to share the same optical fiber. Thus, the PON functions as a point-to-multipoint network. A PON may conform to any of a variety of PON standards, such as the broadband PON (BPON) standard (ITU G.983), the gigabit-capable PON (GPON) standard (ITU G.984), Ethernet PON (EPON) standard (IEEE 802.3), and gigabit-EPON (GE-PON) standard, as well as future PON standards under development by organizations such as the Full Service Access Network (FSAN) Group. In an active optical network, such as an active Ethernet optical network, the optical network operates as a point-to-point network. When fiber reaches a premise where one or more subscriber devices are located, the service is commonly referred to as Fiber to the Premises (FTTP).

In FTTP services, an optical network terminal (ONT) terminates an optical fiber that extends to a subscriber premise, such as a business or enterprise, and connects the subscriber devices, such as public branch exchange (PBX) devices, routers, or other subscriber devices to the optical network. The ONT delivers the signals on the optical fiber to the subscriber devices to provide the FTTP services, and receives signals from the subscriber devices and transmits the signals upstream via the optical network. In this manner, the ONT may support a wide variety of services, such as digital signal-1 (commonly referred to as "T1") services, over the optical network.

Typically, the optical network couples to a network, such as a wide area network (WAN), a metropolitan area network (MAN) or the like, that interconnects one or more optical networks together and may also interconnect these optical networks to a public network, such as the Internet. The WAN may be referred to as a backbone network because it interconnects or provides the backbone to support delivery of information for a plurality of networks, such as the optical network. The backbone network may use any of a variety of transports to transfer information to and from the optical network. For example, the backbone network may comprise a network that implements synchronous optical networking (SONET) and that transports the information to and from the optical network using a legacy transport, such as an asynchronous transport mode (ATM) or ATM transport. As another example, the backbone network may transport information to and from the optical network using next generation transport, such as an Ethernet transport. Next generation Ethernet transports may better utilize the bandwidth of the underlying fiber links of the backbone networks. As a result of the bandwidth gains, the Ethernet transport is quickly emerging as the transport of choice for the backbone network.

SUMMARY

This disclosure is directed to devices and methods for facilitating configuration of clock recovery modes within ONTs in optical networks. More particularly, this disclosure describes an ONT that automatically selects a clock recovery mode. The ONT may automatically select the clock recovery mode in the sense that the ONT selects one of a plurality of clock recovery modes without requiring an administrator to configure a particular clock recovery mode. Instead, the ONT may dynamically determine a type of optical network to which the ONT connects and a type of service provided by the ONT to subscriber devices, and selects the clock recovery mode based on the two determined types.

In some instances, the automatic clock recovery mode selection techniques select a most optimal clock recovery mode from the plurality of clock recovery modes based on the type of optical network and the type of service. The clock recovery selection techniques of this disclosure may improve the ease and accuracy with which the administrator or other user may configure the ONT. As the administrator may not be required to configure the ONT to select the appropriate clock recovery mode, the ONT may improve clock recovery (e.g., by avoiding mis-configuration) and lessen configuration burdens on administrators (e.g., by eliminating an administrator's need to understand and/or teach other administrator's or personnel the specifics of clock recovery).

In one embodiment, a method comprises automatically determining, with an optical network terminal, a type of optical network to which the optical network terminal connects, determining, with the optical network terminal, a type of service provided by the optical network terminal to one or more subscriber devices coupled to the optical network terminal, and automatically selecting, with the optical network terminal, a clock recovery mode based on the determined type of optical network and the determined type of service.

In another embodiment, an optical network terminal that terminates a fiber link of an optical network, the optical network terminal comprises a clock mode selection module that automatically determines, a type of the optical network to which the optical network terminal connects, and a management interface that determines a type of service to provide to one or more subscriber devices coupled to the optical network terminal. The clock mode selection module further automatically selects a clock recovery mode based on the determined type of optical network and the determined type of service.

In another embodiment, a network system comprises an optical network, an optical network terminal that terminates a fiber link of the optical network, and an optical line terminal that couples to the optical network terminal via the optical network. The optical network comprises a clock mode selection module that automatically determines, a type of the optical network to which the optical network terminal connects, and a management interface that determines a type of service to provide to one or more subscriber devices coupled to the optical network terminal. The clock mode selection module further automatically selects a clock recovery mode based on the determined type of optical network and the determined type of service.

In another embodiment, a computer-readable storage medium comprising instructions that cause a programmable processor to automatically determine, with an optical network terminal, a type of optical network to which the optical network terminal connects, determine, with the optical network terminal, a type of service provided by the optical network terminal to one or more subscriber devices coupled to the optical network terminal, and automatically select, with the optical network terminal, a clock recovery mode based on the determined type of optical network and the determined type of service.

The details of one or more embodiments of the invention are set forth in the accompanying drawings and the description below. Other features, objects, and advantages of the invention will be apparent from the description and drawings, and from the claims.

BRIEF DESCRIPTION OF DRAWINGS

FIGS. 2A-2H are block diagrams each illustrating one of example network systems in which an optical network terminal respectively implements the techniques described in this disclosure.

DETAILED DESCRIPTION

This disclosure is directed to devices and methods for facilitating the configuration of ONTs in optical networks. The devices and methods of this disclosure may reduce, if not eliminate, the need to manually configure a clock recovery mode by which an ONT recovers a clock for a time-dependent service, such as a T1 service. The ONT may automatically select the clock recovery mode based on a dynamically determined state of the optical network. For example, the ONT may automatically select the clock recovery mode based on a type of optical network to which the ONT is coupled and a type of service provided to one or more subscriber devices to which the ONT is coupled. In this sense, the ONT may perform adaptive clock recovery and, more specifically, adapt the clock recovery mode to a current state of the optical network.

Figure 1:
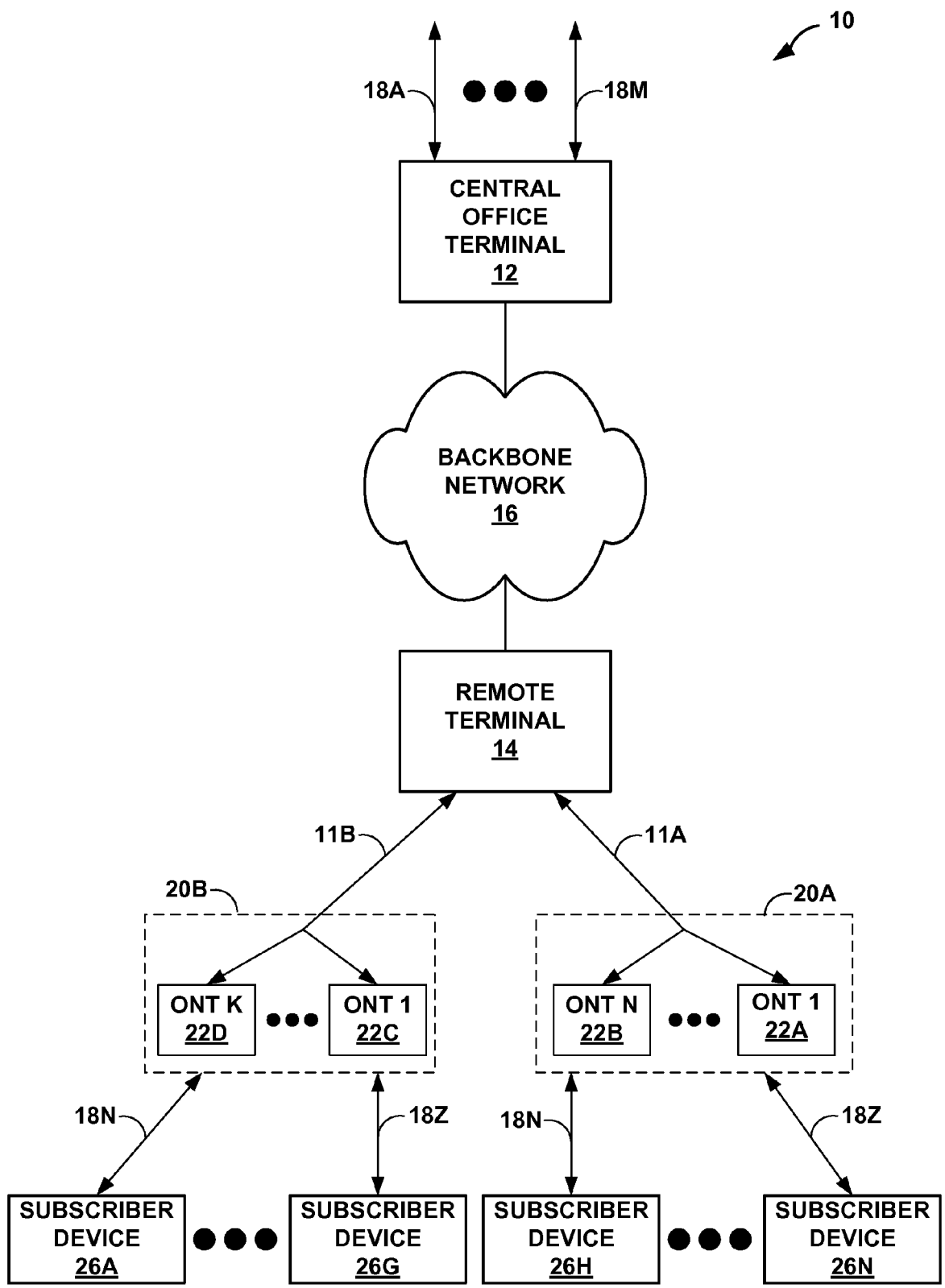
FIG. 1 is a block diagram illustrating an example optical network that delivers content or information to a number of subscribers via optical fiber links.

FIG. 1 is a block diagram illustrating an example optical network 10 that delivers content or information to a number of subscribers via optical fiber links. As shown in FIG. 1, optical network 10 includes a central office terminal 12 and a remote terminal 14. Central office terminals 12 may be coupled to remote terminal 14 via backbone network 16. Backbone network 16 may comprise a ring or other network topology. Ring networks are generally considered resilient in that traffic may flow in either the clockwise or counter-clockwise direction around the ring such that traffic may be quickly re-routed to account for a fault in one of the fiber links that form the ring or failure of one of central office terminal 12 or remote terminal 14. Backbone network 16 may interconnect one or more computer networks together and may also interconnect these computer networks to a public network, such as the Internet. Backbone network 16 may, for example, comprise a wide area network (WAN) that serves a number of customer networks in geographically separate locations or a metropolitan area network (MAN) that serves densely populated metropolitan areas.

Backbone network 16 couples to central office terminal 12, which represents a terminal capable of managing delivery of a wide variety of services, such as legacy services and next generation Internet Protocol (IP)/Ethernet services. Example legacy services include digital subscriber line (DSL) services, plain old telephone line services (POTS), Digital Signal 1 (DS1) services (also known as T1 or E1 services) or the like. Examples of next generation IP/Ethernet services include voice-over-IP (VoIP) services, digital video over IP, and IP-television (IPTV) services. For ease of illustration, it is assumed that central office terminal 12 manages delivery of a plurality of DS1 services, each of which may be commonly referred to as a "T1 service." Thus, central office terminal 12 receives a plurality of T1 services 18A-18M ("T1 services 18" or "T1s 18"), although central office terminal 12 may receive any of the above listed service types as well as any other types of service typically managed by a central office terminal of an optical network. A T1 service may, for example, be a dedicated T1 line that is leased or owned by a subscriber, such as a business or enterprise. The subscriber may send and receive any type of data via the dedicated T1 line, including voice data, network data and/or video data. As such, a T1 service may be used to provide voice, network and/or video data to the subscriber.

Typically, a business or enterprise leases the T1 line or a plurality of T1 lines from one or, in the instance of multiple T1 lines, more service providers. The service provider may therefore be viewed as providing a T1 service to the subscriber, where the T1 service generally denotes a specific allocation of dedicated bandwidth. A T1 service may provide approximately 1.536 megabits per second of dedicated (or unshared) bandwidth to the subscriber in both the upstream and downstream directions, as T1 is considered a full-duplex circuit. In this instance, central office terminal 12 may interface with a plurality of T1 lines and process data corresponding to each of T1 services 18 to route the data or, more generally, T1 services 18 to a given subscriber, which are represented in FIG. 1 as subscriber devices 26A-26N ("subscriber devices 26").

The business or enterprise may own one or more of subscriber devices 26, which may comprise one of a public branch exchange (PBX) device, a router, or any other device capable of interfacing with a service, such as T1 services 18. The business may employ these subscriber devices 26 to facilitate the transfer of any type of data, including voice data (by employing a PBX device), network data (by employing a router), or video data. Subscriber devices 26 may process the data corresponding to T1 services 18 and deliver all or portions of the data to end-user devices (not shown in FIG. 1), such as telephones, laptops, workstations, servers, mobile or cellular telephones, personal digital assistants (PDAs), televisions or other display devices, or any other device capable of transmitting and receiving data corresponding to the service.

In addition to originating services as described above, central office terminal 12 may also provide an interface to backbone network 16 in a manner substantially similar to that described below with respect to remote terminal 14. Remote terminal 14 of backbone network 16 represents a terminal that may be capable of delivering any of the above listed services, either to other remote terminals similar to remote terminal 14 but not shown in FIG. 1 for ease of illustration purposes, central office terminal 12, one or more ONTs (e.g., ONTs 22A-22D), or a combination thereof. Remote terminal 14 may therefore provide an interface to backbone network 16. Remote terminal 14, for example, couples to each of ONT groups 20A, 20B ("ONT groups 20") via optical fiber links 11A, 11B, respectively, to facilitate the transfer of services to ONTs 22 of each of respective groups 20A, 20B by way of backbone network 16. In this manner, remote terminal 14 and ONTs 22 terminate opposite ends of fiber links 11A, 11B respectively. That is, ONTs 22 couple to remote terminal 14, where remote terminal 14 may facilitate the transfer of services between ONTs 22 and backbone network 16.

Either or both of central office terminal 12 and remote terminal 14 may include one or more optical line terminals (OLTs) (not shown in FIG. 1) that terminate optical fiber links, such as optical fiber links 11A, 11B, and the optical links included within backbone network 16 but not shown for ease of illustration purposes. In each case, the OLTs receive data associated with a service, such as one or more of T1 services 18, and distribute the data or information along optical fiber links 11A, 11B, and those of backbone network 16 in the form of optical signals to ONTs 22 of ONT groups 20A and 20B. The OLTs may be located near or far from ONTs 22. However, the OLTs are typically located in a telecommunication company central office, such as central office terminal 12, but may also be located remotely, such as in remote terminal 14. As a result, central office terminal 12 or remote terminal 14 may, in some instances, be referred to as "OLT 12" or "OLT 14," respectively.

Although not shown in exacting detail in FIG. 1 for ease of illustration purposes, each of ONT groups 20 may comprise a number of optical fiber links similar to fiber links 11A, 11B that are split off of fiber links 11A, 11B using passive optical splitters (e.g., in the case of GPON) or active optical switches (e.g., in the case of active Ethernet). ONT group 20A includes ONTs 1-N, designated in FIG. 1 as "ONT 1 22A" and "ONT N 22B" to indicate a plurality of ONTs 22. ONT group 20B includes ONTs 1-K, designated in FIG. 1 as "ONT 1 22C" and "ONT K 22D" to indicate another plurality of ONTs 22. Each of ONT groups 20 may comprise any number of ONTs 22, and the above designations should not be construed as requiring a particular number of ONTs or that each of ONT groups 20 include the same number of ONTs 22. Instead, ONT group 20A may include a first plurality of ONTs 22 and ONT group 20B may include a second plurality of ONTs 22, each of the first and second plurality of ONTs 22 being the same or different in number.

Each one of the plurality of ONT 22 of each of ONT groups 20 terminates a fiber link split off from fiber links 11A, 11B using the above described passive optical splitters, e.g., for downstream communication. Each of ONT groups 20 may also include passive optical combiners to perform the inverse function of the passive optical splitters, in the case of passive optical splitters, thereby combining a plurality of fiber links into single fiber links 11A, 11B, e.g., for upstream communication. Each of ONT groups 20 are shown in FIG. 1 without passive optical splitters and optical combiners for ease of illustration. Moreover, while shown as comprising only two ONT groups 20, optical network 10 may comprise additional ONT groups 20 that interface with backbone network 16 via remote terminals 14A-14C and central office terminal 12. Additionally, one or more ONT groups 20 may couple to other remote terminals not shown in FIG. 1 for ease of illustration purposes. As a result, the techniques described in this disclosure should not be limited to the exemplary embodiment described with respect to FIG. 1.

In some embodiments, each of ONT groups 20 represents part of a passive optical network (PON) that passively splits a single fiber link 11A, 11B among multiple ONTs 22, respectively. In this instance, each of ONT groups 20 may represent a network that operates in accordance with a PON standard, such as a gigabit PON (GPON) as defined by the international telecommunication union (ITU) standard G.984 (ITU G.984), as well as any other type of PON, such as a broadband PON (BPON) as defined in standard ITU G.983, an Ethernet PON (EPON) as defined in standard IEEE 802.3, and future PONs under development by organizations such as the Full Service Access Network (FSAN) Group.

However, ONT groups 20 may, in the other embodiments, each comprise an active Ethernet network, which can be differentiated from a PON in that an active Ethernet network actively routes data between endpoints, e.g., ONTs 22 and OLTs of either central office 12 or remote terminal 14. In contrast, PONs remain passive and do not route data between endpoints, instead broadcasting data to all of the endpoints regardless of the address or other identifier associated with the endpoint. An active Ethernet network also differs from a PON in that the active Ethernet network provides point-to-point connectivity. In other words, instead of employing passive optical splitters and combiners that passively split and combine optical links 11A, 11B, one or more powered components (referred to herein as "active optical switches") may be used to actively route the optical network traffic. For example, each of the plurality of ONTs 22 may be coupled to an intermediate optical switch (not shown) or remote terminal 14 via a separate optical link similar to optical link 11A or 11B. The techniques described in this disclosure therefore are not limited to passive optical networks, but may be applicable to active or non-passive networks, such as an active Ethernet network. In some instances, one of ONT group 20s may comprise a PON, while another one of ONT groups 20 comprises an active Ethernet network.

To communicate data downstream (e.g., from remote terminal 14 to ONT groups 20), remote terminal 14 may communicate with each of ONT groups 20 in accordance with one of the above described standards by which each of ONT groups 20 communicates information, such as voice, video and data units. For example, remote terminal 14 may provide services in accordance with one of the above-listed PON standards to ONT group 20A while also providing services in accordance with the above listed active Ethernet standard to a different ONT group 20B.

Backbone network 16 may use any of a variety of transports to transfer information between terminals 12, 14 and ONTs 22. In one example, backbone network 16 may comprise a network that implements SONET and that transports the information using a legacy transport, such as an ATM transport. In other words, the information conforms to ATM protocol. The ATM transport may inefficiently utilize the bandwidth of backbone network 16. Therefore, it may be desirable to upgrade backbone network 16 to transport information in accordance with a transport mechanism that better utilizes the bandwidth of the underlying fiber links of backbone network 16. For example, a service provider may upgrade backbone network 16 to utilize a next generation transport, such as an Ethernet transport. After upgrading backbone network 16 in this manner, the information is sent over backbone network 16 in accordance with the next generation, e.g., Ethernet, protocol. Further, the service provider may upgrade ONT groups 20 from a passive optical network (PON) to an active network to further take advantage of the upgrade from the ATM to the Ethernet transport in the backbone networks.

Typically, the service provider may first upgrade backbone network 16 to take advantage of the improved efficiency, in terms of bandwidth, provided by the Ethernet transport. The service provider may also upgrade to the Ethernet transport because the hardware and/or software to support this Ethernet transport may cost less than comparable hardware and/or software to support the ATM transport, as a result of economies of scale due to wide use of Ethernet transports in IP networks. Moreover, the service provider may upgrade to the Ethernet transport because maintenance costs associated with Ethernet networks are much lower, especially over the long-term. That is, managing an Ethernet/IP network, when compared to managing a SONET network, is much easier and therefore requires less technical support, which is often costly and may result in delays that interrupt service.

However, the service provider may not immediately upgrade ONT groups 20 from a PON network, which supports both Ethernet and ATM transports, to an active Ethernet network, which only supports the Ethernet transport. In particular, costs associated with actively powered components to route the traffic and the cost of laying fiber in the point-to-point configuration discussed above may be an obstacle to immediate transition to Ethernet transports. At some later point, the service provider may lay the additional fiber required for the point-to-point configuration and upgrade from the PON standard to the active Ethernet standard to further benefit from bandwidth and cost savings associated with Ethernet transport.

While increasing the bandwidth of backbone network 16, reducing maintenance costs, and possibly reducing overall costs of equipment, upgrading backbone network 16 may disrupt delivery of legacy time-dependent services, such as T1 lines 18. T1 lines 18 may be "time-dependent" in that each of T1 lines 18 represents a time-division multiplexed (TDM) signal, whereby data from different sources may be multiplexed onto and carried by a single signal. To multiplex and, more importantly, de-multiplex the signal, each device within the network, such as terminals 12, 14 and ONTs 22, may utilize a common clock or timing signal.

Often, the common clock is maintained by one device within the network and timing or clock information is inherited by every other device within the network typically in a hierarchical fashion. For example, telephone networks may employ various stratums of clocks, where a master primary reference source (PRS) maintains a very accurate clock referred to as a stratum 1 clock or Primary Reference Clock (PRC). Devices in the second stratum or stratum 2, such as those responsible for transmitting large amounts of backbone or so-called "long-haul" traffic inherit the clock, e.g., receive timing information, directly from the stratum 1 master PRS.

Devices in the third stratum or stratum 3, such as those devices located in local offices, inherit the clock, e.g., receive clock information, from the stratum 2 devices. As a result, the entire network may derive the clock from a central or master device, e.g., the master PRS. This type of system may be referred to as a "synchronous" system. In this synchronous system, each element or network device of the network may be able to "trace" its clock back to the primary source (e.g., the device that maintains the common clock signal). These types of networks may, for this reason, also be referred to as "traceable" networks.

To emulate delivery of legacy time-dependent services, such as T1s 18, the some network protocols, such as the ATM protocol, provide for synchronous timing using a clock recovery mode referred to as a "differential" clock recovery mode. In the differential clock recovery mode, each node, element or network device of backbone network 16 may recover a timing signal from a previous node, element or network device. In some instances, a master device maintains a difference between a T1 clock, which may be referred to as the "service clock" and a so-called "network clock" by which the network operates. The master or sending device may transmit this difference to slave or receiving devices, which may utilize this difference to update clocks maintained locally by each of the slave devices. In this manner, the network may emulate a physical circuit to recover the service clock form the network clock. Those networks that implement this form of clock recovery may therefore be referred to as a "traceable" network as the timing signal may be traced through the network.

The Ethernet protocol, however, may generally (and more particularly protocols for emulating T1 services over Ethernet such as a PseudoWire Edge-to-Edge Emulation or PWE3 protocol) does not mandate any particular clock recovery mode nor provide strict requirements by which to transmit clock or timing information in order to maintain synchronized clocks. In networks that implement the Ethernet transport protocol, such as the PWE3 protocol, each node, element or network device may maintain a separate clock that may differ from one or more other clocks maintained by other nodes, elements or network devices within the network.

As a result, these Ethernet networks may be referred to as "asynchronous networks," because the clocks are not synchronized. Moreover, these networks may be characterized as "un-traceable networks" because the timing or clock information cannot be traced back to a single primary source, contrary again to the native networks and those that implement the other network protocols described above. In this respect, the T1 service clock may differ substantially from the plurality of network clocks maintained by the backbone Ethernet devices.

In these asynchronous networks, each node recovers the local service clock from timing information stored inside Ethernet packets, if available. Notably, in smaller networks this recovery may proceed with relative accuracy to enable pseudo-synchronized service delivery. However, as networks expand, these larger networks may experience increased congestion that may cause routing delay, disrupting the timing and complicating the clock recovery algorithm. At some point, recovery of the service clock from the network clock may become impossible. As a result, service providers may not deploy Ethernet protocols and, particularly, the PWE3 protocol to emulate delivery of T1 services 18 over backbone network 16. Instead, these service providers may opt to maintain the legacy transports despite the benefits provided by upgrading to the Ethernet transport.

In accordance with the techniques described in this disclosure, one or more of ONTs 22 may use the clock recovery mode selection techniques described herein to facilitate adoption of Ethernet transports in backbone network 16 and thereby promote more economical use of bandwidth while reducing maintenance and management related costs. ONTs 22 may facilitate adoption of the Ethernet transport, and particularly the PWE3 protocol, by extending the reach of PWE3 across optical network 10. As described above, the PWE3 protocol may prohibit clock recovery as optical network 10 grows larger or, in other words, scales, where the PWE3 protocol may in effect limit the scalability of optical network 10, thereby discouraging the adoption of PWE3 in backbone network 16.

However, both the GPON (and any of the other PON standards listed above) and Active Ethernet (AE) protocols may support traceability as an option. In other words, both GPON and AE networks (or, more generally, synchronous Ethernet networks) may employ timing requirements similar to that of other synchronous networks, such as networks that implement the ATM protocol referred to as "ATM networks." This intermediate GPON or AE network may therefore increase the reach of the PWE3 protocol by virtue of the improved timing supported by these GPON or AE networks and, as a result, provide more incentive to deploy PWE3 services across Ethernet-based networks. In this respect, the techniques may leverage the improved timing capabilities of GPON or AE networks to extend the reach of the PWE3 protocol such that the PWE3 protocol may better scale as networks grow.

For example, one of ONTs 22 may include a processor or other computing module to automatically determine the type of optical network to which the one of ONTs 22 connects. A "type" of network may refer to the protocol by which the network operates, such as one of the PON protocols (e.g., GPON) or a synchronous Ethernet protocol (e.g., active Ethernet or AE for short). As described in more detail below, determining the type of network may also include the one of ONTS 22 determining a traceability of the network and/or whether the network provides information necessary to implement (or, in other words, supports) differential timing.

ONT 22A may, for example, automatically determine that the optical network between an OLT, such as might be housed within remote terminal 14 and which may be referred to again as OLT 14, and ONT 22A comprises a GPON. GPON refers to the optical protocol by which data is sent on optical links 11A, 11B and is implemented by ONTs 22 and the OLTs coupled to links 11A, 11B. In this respect, links 11A, 11B, ONTs 22 and the OLTs may be referred to collectively as a "GPON 11A" and a "GPON 11B," respectively.

ONT 22A may detect this type of optical network based on interactions with OLT 14, such as messages, data units, other configuration information necessary to establish ONT 22A within GPON 11A. As one example, ONT 22A may detect and/or determine the type of optical network to which ONT 22 is coupled by loading configurations to configure itself in accordance with different optical network protocols until ONT 22A is appropriately configured, as described in U.S. patent application Ser. No. 12/121,283, filed May 15, 2008 by Biegert et al., entitled "OPTICAL NETWORK INTERFACE DEVICES AND METHODS," which is incorporated herein by reference in its entirety.

After determining this type of optical network, the one of ONTs 22 may determine a type of service provided to subscriber devices connected to the one of ONTs 22. A "type" of service may refer to whether T1 services 18 are synchronous, asynchronous or a combination thereof. A "synchronous T1 service" may refer to instances where the T1 service is clocked at the same rate as optical network 10 and thus the T1 service clock is synchronous with the optical network clock. An "asynchronous T1 service" may refer to instances where the T1 service is clocked at a different rate than optical network 10, and thus the T1 service clock is asynchronous to the optical network clock.

Typically, an administrator determines whether a given T1 service is synchronous or asynchronous based on a configuration of T1 services 18 and optical network 10. For example, if each of T1 services 18 are received from the same service provider, e.g., American Telephone & Telegraph Co. (AT&T) or Verizon Communications Inc., typically each of T1 services 18 may be clocked the same (e.g., reference the same PRS or PRC). In this instance, the administrator may configure optical network 10 to clock at the same rate or derive its clock from T1 services 18 (e.g., from the same PRS or PRC) and, therefore, synchronize optical network 10 to deliver synchronous T1 services 18.

However, if, in other instances, one or more of T1 services 18 are received from a different service provider than the other ones of T1 services 18, these one or more T1 services 18 may be clocked at a different rate than the other ones of T1 services 18. In other words, one set of T1 services 18 may derive its clock from or reference a first PRS while another (e.g., second) set of T1 services 18 may derive its clock from or reference a second PRS different from the first PRS. In this instance, the administrator may be unable to synchronize optical network 10 to both the first and second PRS. The administrator may then choose to synchronize to one of the first and second PRS or neither of the first and second PRS. If synchronized to one, either the first or second set of T1 services 18 may be synchronous T1 services while the other set of T1 services may be asynchronous T1 services. If synchronized to neither of the first and second PRS, both the first and second set of T1 services 18 are asynchronous T1 services.

Given the context for determining the type of service provided to subscriber devices 26, an administrator normally provisions this type of service given the scope and understanding required to accurately identify the type of T1 service delivered to subscriber devices 26. Consequently, the one of ONTs 22, such as ONT 22A, may determine the type of service from configuration or provisioning information concerning the type of service entered or specified by an administrator. While the administrator may be required to configure the type of service, the administrator need not determine or enter the type of clock recovery mode, as described below. This "type" of service may be unimportant to end-users, as it affects the delivery of the service within optical network 10 wholly transparent to subscriber devices 26. In other words, the type of service relates to delivery of T1 services over the intermediate optical network 10 and typically does not detrimentally affect the performance or other aspects of T1 service 18.

Based on the type of optical network, e.g., PON or AE, and type of service, e.g., asynchronous or synchronous, ONT 22A may, for example, select one of a plurality of clock recovery modes. In some instances, the clock recover mode selection techniques may enable ONT 22A to select a most optimum or most accurate clock recovery mode from the plurality of clock recovery modes based on the type optical network and a type of service. Exemplary clock recovery modes may include line timing, differential timing and adaptive timing, which may be a first, second and third clock recovery mode, respectively. Each of these three clock recovery modes may vary in their ability to accurately recover the service clock from the network clock.

The first clock recovery mode, referred to as "line timing," may not require any actual clock recovery. In this sense, referring to line timing as a clock recovery mode may be a misnomer. Line timing may only be used when the type of service is synchronous, which, as described above, indicates that optical network 10 is clocked at the same rate as T1 services 18. As a result, ONT 22A may not "recover" the service clock from the network clock as the network clock is the same as the service clock. Considering the synchronicity between the network clock and service clock, ONT 22A may "recover" the service clock by utilizing the network clock. As these two clocks are synchronized, line timing may represent the most accurate form of clock recovery.

The second clock recovery mode, referred to as "differential timing," may entail recovering the service clock based on two data points. The first data point may comprise service clock information, such as Real-time Transport Protocol (RTP) headers that include timestamps relating a packet to a real point in time, such as a PRC. More information regarding RTP timestamps and RTP in general can be found in Request For Comments (RFC) 3550, titled "RTP: A Transport Protocol for Real-Time Applications," published by the Network Working Group of the Internet Engineering Task Force (IETF), dated July 2003, incorporated herein by reference in its entirety. The second data point may comprise network clock information, such as rate at which packets are received by a buffer that is often referred to as "packet inter-arrival time." Differential timing may be a less accurate form of clock recovery than line timing.

The third clock recovery mode, referred to as "adaptive timing," may entail recovering the service clock based on the above described second data point, but not the first data point. For either differential or adaptive timing, ONT 22A may acquire the clock based on the first and second data points or second data point, respectively. At first, ONT 22A may derive a rough estimate of the clock using a control loop. After a period of time, ONT 22A may lock onto a frequency of the clock and begin tracking the clock using a received-packet jitter buffer to drive frequency synthesis. ONT 22A may perform this frequency synthesis using a second control loop.

Considering that adaptive timing or clock recovery may utilize only a portion of the information of differential clock recovery or timing, it follows logically that differential timing may be more accurate than adaptive clock timing, especially considering that differential timing makes use of RTP or other similar timestamps to transmit information concerning the service clock. Less accurate clock recovery may limit the number of active hops or active intermediate devices that can be positioned between an OLT and an ONT, and thereby decrease the reach of the PWE3 service or protocol. Overextending the reach of PWE3 by inserting too many active hops between the OLT and the ONT for a given clock recovery mode (especially, adaptive clock recovery) may introduce excessive clock wander and/or jitter, which may lead to or increase errors, when recovering T1 services transmitted via the PWE3 protocol.

In this respect, a most optimal or most accurate clock recovery mode may be "most accurate" in that the selected most accurate clock recovery mode may limit data recovery errors when compared to a number of errors resulting from the other clock recovery modes. For those modes that are unavailable, it is assumed that the number of errors resulting from the other unavailable clock recovery modes reaches a 100% error rate or, in other words, that for every data frame of a T1 service transmitted, an error occurs 100% of the time. Thus, even adaptive clock recovery may recover a clock more optimally or more accurately than an unavailable line timing clock recovery mode.

ONT 22A may select, based on the determined type of optical network and type of service, one of the three clock recovery modes. In some instances, ONT 22A may select the most optimal or most accurate clock recovery mode of the three clock recovery modes based on the determined type of optical network and type of service. The most optimal clock mode may, for example, be the clock recovery mode that generates the most accurate timing clock. To illustrate, if ONT 22A determines that network 11A is a GPON and that synchronous T1 services are provided to subscriber devices 26, ONT 22A may dynamically or automatically select line timing clock recovery mode. Given these circumstances, line timing is the most optimal clock recover mode because the optical network clock is synchronized with the T1 service clock (which means the network clock is traceable to the T1 service clock) and thus ONT 22A may recover the service clock using the network clock in place of the service clock. In some instances, a passive optical network, such as GPON, may not be traceable or lose traceability, and ONT 22A may dynamically or automatically default to the adaptive clock recover mode.

However, if ONT 22A determines that the type of optical network is GPON but that the type of service is asynchronous, ONT 22A may dynamically or automatically select either differential or adaptive timing, as line timing is not an available mode of clock recovery for asynchronous T1 services due to the differences between the network and service clocks. ONT 22A may dynamically or automatically select between these two clock recovery modes by determining first whether the network is traceable and second whether the network supports differential timing.

ONT 22A may, as one example, determine network traceability based on whether the network supports Synchronization Status Messaging (SSM), as outlined in the International Telecommunication Union (ITU) proposed standard G.8264. An administrator or other user may enable SSM at an OLT included within either one of central office terminal 12 or remote terminal 14. The OLT implements SSM by broadcasting a standardized Ethernet packet downstream to ONTs 22. Thus, ONTs 22 may determine that a network is traceable upon receiving these messages at a sufficient frequency to enable traceability and that the network is untraceable upon failing to receive these messages at the frequency required to enable traceability.

ONT 22A may determine whether the network supports differential timing by, for example, determining whether RTP timestamps are used to pass the common service clock from the clock master (e.g., central office 12 or remote terminal 14) to the clock slave (e.g., ONT 22A). ONT 22A may maintain an aging table or other data structure on which to base the determination of whether ONT 22A receives RTP timestamps with sufficient frequency to enable accurate differential clock recovery. If received with sufficient frequency, ONT 22A may determine that the network supports differential timing. If ONT 22A does not receive RTP timestamps with sufficient frequency, ONT 22A may determine that the network does not support differential timing and default to adaptive clock recovery. In this manner, ONT 22A may dynamically or automatically select for the determined circumstances between differential or adaptive clock recovery to determine which of these clock recovery methods is optimal.

ONT 22A may also determine an optimal clock recovery mode for an AE type of optical network. If ONT 22A determines that network 11A is an AE network and that synchronous T1 services are provided to subscriber devices 26, ONT 22A may select line timing. However, for AE networks, ONT 22A may default to adaptive timing if a traceable network clock is not enabled or fails for the synchronous T1 service. For an AE network and asynchronous T1 service, ONT 22A may further resolve the type of network to again select between differential and adaptive clock recovery modes. ONT 22A, much as in the GPON instance described above, may further resolve, the type of network by determining whether the network is traceable, and if so whether the network supports differential timing. ONT 22A may utilize differential timing, unless the traceable network clock is not enabled or the RTP timestamps arrive with insufficient frequency to accurately reconstruct the service clock. Assuming ONT 22A determines differential timing is insufficient, ONT 22A may dynamically default to adaptive timing, similar to GPON network types, as described above.

In this manner, one or more of ONTs 22 may dynamically and automatically select and configure a particular clock recovery mode given currently determined network topology and provisioned services. These ones of ONTs 22 may, in some instances, select an optimum or most accurate clock recovery mode based on a current state of optical network 10, as dynamically monitored by these ONTs 22, to adapt clock recovery to the current state of optical network 10. Accordingly, ONTs 22 may implement the clock recovery mode selection techniques of this disclosure to perform automatic clock recovery mode selection, which may improve network performance by dynamically optimizing clock recovery to suit a particular network configuration, reduce network oversight by reducing configuration parameters actively required to be input by an administrator and possibly extend the reach of PWE3 by leveraging the timing of GPON and synchronous Ethernet networks. Moreover, by enabling dynamic provisioning of a plurality of clock recovery modes, the techniques of this disclosure may improve clock recovery when conditions permit without requiring any additional equipment at the customer premises, such as additional equipment to implement each of the plurality of clock recovery modes.

FIGS. 2A-2H are block diagrams each illustrating one of example network systems 28A-28H in which an ONT 30 respectively implements the techniques described in this disclosure. For ease of illustration purposes, each of FIGS. 2A-2H depicts respective network system 28A-28H ("network systems 28") that each include a single central office terminal 32, a single remote terminal 34 and a single ONT 30. Each of network systems 28 may, however, include a number of other central office terminals, remote terminals, and ONTs. Additionally, each of network systems 28 may include a plurality of ONTs 30 similar to ONTs 22 of FIG. 1. Central office terminal 32 and remote terminal 34 may each be substantially similar to central office terminal 12 and remote terminal 14 of FIG. 1, respectively.

As shown in FIG. 2A, central office terminal 32 may receive a plurality of T1 services 36A-36M for delivery across a network 38. In the example of FIG. 2A, each of T1 services represent synchronous T1 services 36A-36M ("synchronous T1 services 36"). Synchronous T1 services 36 are "synchronous," as described above, in that a service clock 40A used to clock T1 services 36 is synchronized with a network clock 42 used to clock network terminals, such as central office terminal 32, remote terminal 34, ONT 30 and any devices in network 38. In this respect, network clock 42 may be the same or substantially similar to service clock 40A. Also, in the example of FIG. 2A, network 38 comprises a "traceable" network, which refers to a network in which network clock 42 can be traced back to a primary reference source or clock, as described above. Network 38 may be substantially similar to backbone network 16 of FIG. 1.

ONT 30 may couple to remote terminal 34 via a Gigabit Passive Optical Network (GPON) 44 ("GPON 44"). ONT 30 may include a clock mode selection module 46 that implements the techniques described in this disclosure to adaptively and automatically select a clock recovery mode and, in some instances a most optimal or most accurate clock recovery mode, from a plurality of clock recovery modes. For example, clock mode selection module 46 may select an optimal clock recovery mode from three clock recover modes, a first line timing clock recovery mode, a second differential clock recovery mode and a third adaptive clock recovery mode. A clock recovery mode may be "optimal," as used in this disclosure, in that the clock recovery mode selected from the available clock recovery modes (in this example, three clock recovery modes) provides a most accurate recovery of service clock 40A from network clock 42 at ONT 30 given the type of optical network to which ONT 30 connects and type of service delivered to subscriber devices coupled to ONT 30. The recovered service clock is represented in FIG. 2A as service clock 40B.

Clock mode selection module 46 may dynamically determine the type of optical network 44 to which ONT 30 connects. In one example, clock mode selection module 46 or another module of ONT 30 may determine the type of optical network 44 to which ONT 30 connects using the techniques described in above-mentioned U.S. patent application Ser. No. 12/121,283, filed May 15, 2008 by Biegert et al., entitled "OPTICAL NETWORK INTERFACE DEVICES AND METHODS." In this instance, clock mode selection module 46 determines that ONT 30 connects to remote terminal 34 via GPON 44. It is assumed for purposes of illustration that an OLT (not shown in FIG. 2A) resides within remoter terminal 34 to terminate an end of GPON 44 opposite from an end of GPON 44 terminated by ONT 30. ONT 30 may also receive, from an administrator or other user, configuration or provisioning information indicating the type of service to provide to downstream subscriber devices. The configuration or provisioning information in this instance may indicate that ONT 30 provide synchronous T1 services 36N-36Z. In other words, the administrator may provision ONT 30 with the type of T1 service, either synchronous or asynchronous, but does not indicate the clock recovery mode to use to provide this service. Instead, clock mode selection module 46 may dynamically determine, based on the type of optical network and type of service, the clock recovery mode to use to provide this service.

Assuming the type of optical network is GPON and the type of service is synchronous T1 services 36, clock mode selection module 46 may determine that the line timing clock recovery mode is available. Considering that, of the three clock recovery modes, line timing is the most accurate (as described above) and therefore most optimal, clock mode selection module 46 may select this mode over the other three modes as the clock recovery mode. ONT 30 may utilize the clock provided by the network, e.g., network clock 42, in place of service clock 40A to "recover" service clock 40B. Network clock 42 may, in this instance, comprise a line signal that indicates service clock 40B. After recovering clock 40B, ONT 30 may transmit downstream synchronous T1 services 36N-36Z in accordance with recovered service clock 40B.

In some instances, however, even though the type of network is GPON and the type of service is synchronous T1 service, clock mode selection module 46 may determine that the line timing clock recovery mode is not available. These instances may arise, for example, when the network loses traceability, e.g., the network clock cannot be traced back to the service clock. Clock mode selection module 46 may, in these instances, default to the adaptive clock recovery mode, which may recover the clock regardless of the traceability of the network.

FIG. 2B is a block diagram illustrating an example network system 28B. Network system 28B may be similar to network system 28A of FIG. 2A, except that traceable network 38 is no longer traceable, but instead is replaced by a non-traceable or untraceable network 50. Untraceable network 50 may be "untraceable" if the SSM messages, e.g., the above described standardized Ethernet message, are not received before an SSM aging timeout occurs (as indicated by the above described SSM aging table). If untraceable, clock mode selection module 46 may determine that the line timing mode is unavailable and default to the adaptive clock recovery mode. In this instance, whether differential timing is supported does not impact the determination of a clock recovery mode, as an untraceable network will neither support line timing nor differential timing. Considering that only the adaptive clock recovery mode of the three clock recovery modes is available, clock mode selection module 46 may determine that the adaptive clock recovery mode is the most optimal clock recovery mode and utilize the adaptive clock recovery mode in the manner described above to recover service clock 40B from network clock 42. ONT 30 may then deliver or provide asynchronous T1 services 48N-48Z to downstream subscriber devices.

FIG. 2C is a block diagram illustrating an example network system 28C. Network system 28C may be similar to network system 28A of FIG. 2A, except that central office terminal 32 may receive one or more asynchronous T1 services 48A-48M and ONT 30 may deliver one or more asynchronous T1 services 48N-48Z downstream. As described above, for asynchronous T1 services 48A-48M, network clock 42 may not be synchronized with service clock 40A used to clock the T1 services 48A-48M. As a result, these T1 services 48A-48M are not synchronized with network clock 42, and are thus asynchronous T1 services.

As described above, clock mode selection module 46 may first dynamically determine the type of optical network to which ONT 30 connects and then determine the type of services 48N-48Z ONT 30 delivers to downstream subscriber devices. Clock mode selection module 46 may determine, similar to ONT 30 as described with respect to FIG. 2A, that ONT 30 connects to GPON 44. Clock mode selection module 46 may however then be provisioned to delivery an asynchronous type of service. Assuming the type of optical network is GPON and the type of service is asynchronous, clock mode selection module 46 determines that line timing clock recovery mode is unavailable. As described above, the line timing clock recovery mode is unavailable for asynchronous T1 services. Clock mode selection module 46 may then further resolve the type of network to determine first whether the network is traceable and second whether the network supports differential timing. With respect to determining whether the network supports differential timing, clock mode selection module 46 may perform this determination, as the differential clock recovery mode is more accurate at recovering service clock 40B than the adaptive clock recovery mode.

Clock mode selection module 46 may determine whether the network is traceable in the context of network system 28C by, as one example, determining whether SSM has been enabled or some similar mechanism, protocol or technique by which to gauge traceability. SSM is used in this disclosure merely for purposes of illustration and the techniques should not be limited to any particular mechanism for determining traceability. Notably, GPON networks, such as GPON 44, may not natively support SSM or other mechanisms, however, SSM may be adapted to operate within GPON 44 or other similar PONs, much as SSM has been adapted to operate in the AE network context, as outlined in ITU proposed standard G.8264. Regardless, clock mode selection module 46 may maintain SSM aging tables by which to determine network traceability similar to the below described RTP aging tables described above.

Assuming for purposes of illustration that clock mode selection module 46 determines that the network is traceable, clock mode selection module 46 may also determine whether GPON 44 supports differential timing, which in the context of GPON 44 may refer to whether Real-time Transmission Protocol (RTP) timestamps have been enabled. Typically, the OLT, which is assumed to be included within remote terminal 34 for purposes of illustration, may be configured to generate RTP timestamps to pass the common clock from a clock master, e.g., central office terminal 32, to a clock slave, e.g., ONT 30. While described with respect to an OLT located at remote terminal 34, the techniques may apply to other configurations where the OLT is located at central office terminal 32.

Clock mode selection module 46 may maintain an aging table to determine whether an RTP timestamp has been received with sufficient frequency to permit accurate recovery of service clock 40B. If an RTP timestamp is received before an aging timeout occurs (as indicated by the aging table), clock mode selection module 46 may adaptively select the differential clock recovery mode as the most optimal mode given GPON 44 and asynchronous T1 services 48. Clock mode selection module 46 may then implement the determined differential clock recovery mode, as described above, to recover service clock 40B from network clock 42 and provide asynchronous T1 services 48A-48N to subscriber devices in accordance with the recovered service clock 40B.

FIG. 2D is a block diagram illustrating a network system 28D that operates in accordance with the techniques set forth in this disclosure. Network system 28D may be similar to network system 28C of FIG. 2C, except that traceable network 38 is no longer traceable, but instead is replaced by non-traceable or untraceable network 50. Untraceable network 50 may be "untraceable" if the SSM messages, e.g., the above described standardized Ethernet message, are not received before an SSM aging timeout occurs (as indicated by the above described SSM aging table). If untraceable, clock mode selection module 46 may determine that the differential clock recovery mode is unavailable and default to the adaptive clock recovery mode. Considering that only the adaptive clock recovery mode of the three clock recovery modes is available, clock mode selection module 46 may determine that the adaptive clock recovery mode is the most optimal clock recovery mode and utilize the adaptive clock recovery mode in the manner described above to recover service clock 40B from network clock 42. ONT 30 may then deliver or provide asynchronous T1 services 48N-48Z to downstream subscriber devices.

Figure 2E:
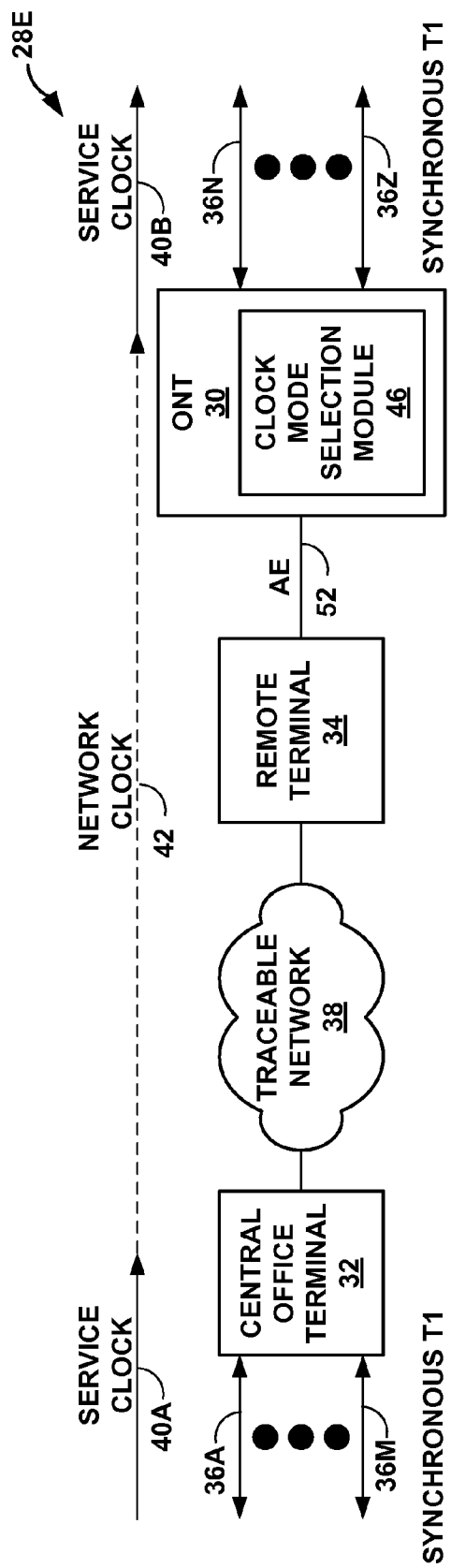

FIG. 2E is a block diagram illustrating a network system 28E that operates in accordance with the techniques described in this disclosure. Network system 28E may be similar to network system 28A, except that ONT 30 couples to remote terminal 34 via an Active Ethernet (AE) network 52 ("AE 52"). Clock mode selection module 46 may therefore dynamically determine that ONT 30 couples to an OLT within remote terminal 34 via an AE type of optical network 52 rather than a GPON type of optical network. Clock mode selection module 46 may, in the manner described above with respect to FIG. 2A, determine the type of service as synchronous T1 services 36A-36M. Based on these two types, clock mode selection module 46 may determine the most optimal clock recovery mode by first determining the availability of the line timing clock recovery mode.

Contrary to defaulting to the line timing mode for the GPON type of optical network determination described above with respect to FIG. 2A, clock mode selection module 46 may, in the AE type of optical network, first determine whether the line timing clock recovery mode is available by monitoring communications arriving over AE 52. In an AE network, SSM messages may specify whether line timing is traceable to a master timing source. More information regarding SSM and clock recovery in AE networks in general can be found in an International Telecommunication Union (ITU) proposed standard G.8264, titled "Draft G.8264 (G.pacmod) V 0.3 (for consent),", dated Feb. 11-22, 2008, herein incorporated by reference in its entirety.

In this respect, clock recover module 46 may determine the type of network by determining the traceability of the network based on SSM messages. Similar to RTP packets in the differential clock recovery mode described above with respect to FIG. 2C, clock mode selection module 46 may, as an example, maintain an SSM aging table to gauge SSM activity. SSM may again be enabled or disabled at the OLT, as located in either central office terminal 32 or remote terminal 34. If enabled, the OLT may, in accordance with SSM, transmit a standardized Ethernet packet downstream to ONT 30. If ONT 30 receives the standardized packet before the aging timeout occurs (as indicated by the SSM aging table), clock mode selection module 46 may select the line timing clock recovery mode as the most optimal clock recovery mode. The line timing clock recovery mode, similar to network system 28A of FIG. 2A, is available as a result of both traceable network 38 and synchronous T1 services 36A-36M. ONT 30 may utilize the line timing clock recovery mode to "recover" service clock 40B, despite actively routed AE network 52, and deliver or provide synchronous T1 services 36N-36Z to downstream subscriber devices.

Much as described above with respect to GPON, the line timing clock recovery mode in the context of AE network 52 may not actually recover the service clock 40B, rather ONT 30 may use network clock 42 in place of the service clock and output network clock 42 as service clock 40B. ONT 30 may use this clock 40B to deliver or provide synchronous T1 services 36N-36Z to downstream subscriber devices.

Figure 2F:
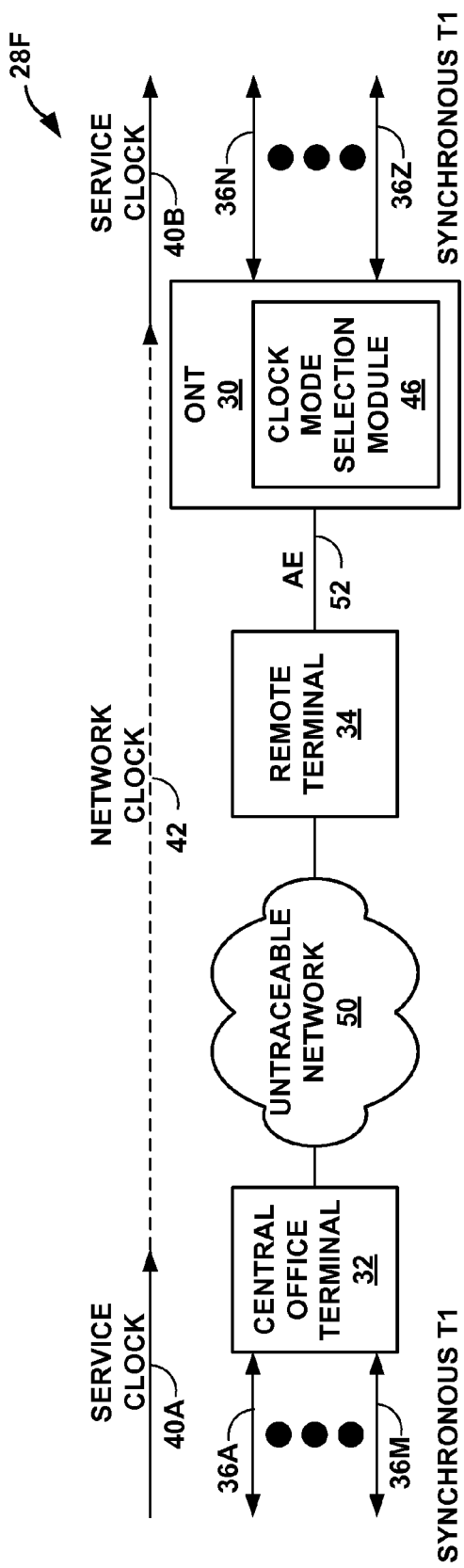

FIG. 2F is a block diagram illustrating a network system 28F that implements the techniques described in this disclosure. Network system 28F may be similar to network system 28E, except that traceable network 38 is no longer traceable, but instead is replaced by a non-traceable or untraceable network 50. ONT 30 may determine the type of network 50 as "untraceable" if an SSM Ethernet message is not received before an aging timeout occurs (as indicated by the above described aging table). If untraceable, clock mode selection module 46 may determine that the line timing clock recovery mode is unavailable and default to the adaptive clock recovery mode. Considering that only the adaptive clock recovery mode of the three clock recovery modes is available, clock mode selection module 46 may determine that the adaptive clock recovery mode is the most optimal clock recovery mode and utilize the adaptive clock recovery mode to recover service clock 40B from network clock 42. ONT 30 may then deliver or provide synchronous T1 services 36N-36Z to downstream subscriber devices.

FIG. 2G is a block diagram illustrating a network system 28G that implements the techniques described in this disclosure. Network system 28G may be similar to network system 28C, except that ONT 30 couples to remote terminal 34 via an Active Ethernet (AE) network 52 ("AE 52"). Clock mode selection module 46 may therefore dynamically determine that ONT 30 couples to an OLT within remote terminal 34 via an AE type of optical network 52 rather than a GPON type of optical network. Clock mode selection module 46 may, in the manner described above with respect to FIG. 2C, determine the type of service as asynchronous T1 services 48A-48M. Based on these two types, clock mode selection module 46 may determine the most optimal clock recovery mode by first determining whether the type of network is traceable or untraceable and second the availability of the differential clock recovery mode, as the line timing clock recovery mode is not available for asynchronous T1 service type.

For the AE type, clock mode selection module 46 may determine whether the differential clock recovery mode is available by first determining whether the network is traceable and then determining whether RTP signals are received with sufficient frequency to accurately recover service clock 40B from network clock 42. Much as described above with respect to FIG. 2E, clock mode selection module 46 may determine whether network 38 is traceable using the SSM mechanism set forth in the above incorporated ITU proposed standard G.8264. Clock mode selection module 46 may monitor communications arriving over AE 52 to determine when SSM Ethernet messages arrive. If these SSM Ethernet messages arrive before an aging timeout, as indicated by an SSM aging table, clock mode selection module 46 may determine that network 38 is a traceable network.

Assuming for purposes of illustration that network 38 comprises a traceable network 38 (as it is shown in the example of FIG. 2G), clock mode selection module 46 may then determine whether RTP timestamps arrive with sufficient frequency (by comparing the arrival of RTP timestamps to an RTP aging timeout as indicated by an RTP aging table) to accurately recover service clock 40B from network clock 42. Again, clock mode selection module 46 may dynamically select the differential clock recovery mode as the most optimal clock recovery mode if the RTP timestamps arrive prior to the timeout and utilize the differential clock recovery mode to recover service clock 40B from network clock 42. ONT 30 may then deliver or provide asynchronous T1 services 48N-48Z in accordance with recovered service clock 40B.

FIG. 2H is a block diagram illustrating a network system 28H that implements the techniques described in this disclosure. Network system 28H may be similar to network system 28G, except that traceable network 38 is no longer traceable, but instead is replaced by a non-traceable or untraceable network 50. Untraceable network 50 may be "untraceable" if an SSM Ethernet message is not received before a respective SSM aging timeout occurs (as indicated by the above described SSM aging tables). If untraceable, clock mode selection module 46 may determine that the differential clock recovery mode is unavailable and default to the adaptive clock recovery mode, as described above. Considering that only the adaptive clock recovery mode of the three clock recovery modes is available, clock mode selection module 46 may determine that the adaptive clock recovery mode is the most optimal clock recovery mode and utilize the adaptive clock recovery mode to recovery service clock 40B from network clock 42. ONT 30 may then deliver or provide asynchronous T1 services 48N-48Z to downstream subscriber devices based on adaptive service clock 40B.

While the techniques are described herein with respect to selecting a clock recovery mode from three particular clock recovery modes, clock mode selection module 46 may select the clock recovery mode from a wide variety of clock recovery modes. In other words, ONT 30 may implement the clock recovery mode selection techniques to adaptively, automatically, or otherwise dynamically select any clock recovery mode by which a service clock may be recovered from a network clock. In some instances, the clock recovery mode selection techniques may ensure that a most optimal clock recovery mode from the plurality of modes is selected. If, in some instances, one or more modes are equally optimal, the most optimal clock recovery mode may be randomly chosen from among those equally optimal or other criteria in addition to network type and service type may be used to further resolve the most optimal clock recovery mode of the plurality of equally optimal clock recovery modes (determined given the network type and service type).

In some instances, one or more of T1 services may be synchronous while other of T1 services may be asynchronous. ONT 30 may implement, in these instances, the techniques to select the clock recovery mode assuming asynchronous T1 services despite that some of the T1 services may be synchronous. In other words, ONT 30 may be provisioned with both a synchronous and an asynchronous T1 service or mixed synchronous/asynchronous T1 services. In these instances, ONT 30 may determine the type of service as asynchronous and proceed to automatically select an optimal or most accurate clock recovery mode given an asynchronous T1 type of service.

Figure 3:
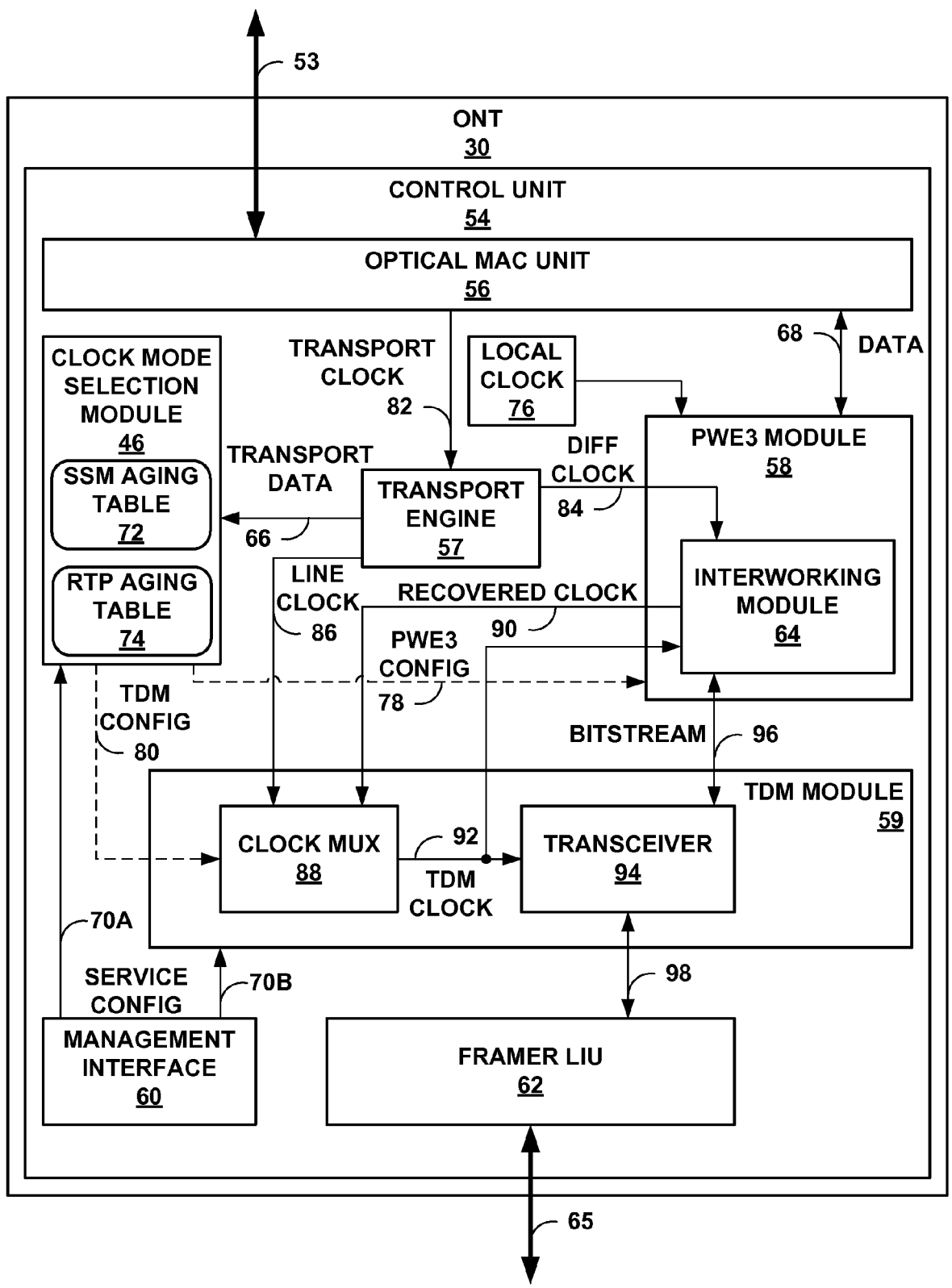
FIG. 3 is a block diagram illustrating an example embodiment of optical network terminal in performing the techniques described in this disclosure.

FIG. 3 is a block diagram illustrating an example embodiment of optical network terminal 30 of FIGS. 2A-2H that performs the techniques described in this disclosure. As will be described in detail below, ONT 30 may automatically and dynamically select a clock recovery mode based on a current state of a network system, such as one of network systems 28A-28G ("network systems 28"). In other words, ONT 30 may automatically and dynamically select a clock recovery mode based on a type of optical network and a type of service delivered. Thus, although described with respect to ONT 30, ONTs 22 of FIG. 1 may comprise similar components, modules and engines to perform the clock recovery techniques described in this disclosure.

ONT 30 may be mounted externally to a wall or other structure of the subscriber premises, e.g., business or enterprise, and may be powered either by an uninterruptible power source (UPS) or battery. ONT 30 may output data corresponding to a service via a service interface (not shown), such that a cable or other connective medium may be coupled to the ONT 30 and routed into the structure of the subscriber to couple with the subscriber devices, such as subscriber devices 26 (FIG. 1). In one example, ONT 30 may connect with subscriber devices 26 via a T1 line.

ONT 30 includes a control unit 54 that represents hardware, software, or a combination of both to implement the techniques described in this disclosure. That is, control unit 54 and its components may, for example, comprise any combination of one or more processors, one or more field programmable gate arrays (FPGAs), one or more application specific integrated circuits (ASICs), and one or more application specific standard products (ASSPs). Control unit 54 may also comprise memory, both static (e.g., hard drives or magnetic drives, optical drives, FLASH memory, EPROM, EEPROM, etc.) and dynamic (e.g., RAM, DRAM, SRAM, etc.), or any other computer readable storage medium capable of storing instructions that cause the one or more processors to perform the techniques described in this disclosure. Thus, control unit 54 may represent any combination of hardware and/or software to support the functions attributed to the components described below, and the techniques should not be strictly limited to any particular embodiment described below. Depiction of different features as modules/units is intended to highlight different functional aspects of the devices illustrated and does not necessarily imply that such modules/units must be realized by separate hardware or software components. Rather, functionality associated with one or more modules/units may be integrated within common or separate hardware or software components.

As shown in FIG. 3, control unit 54 may include a variety of components, modules and engines, such as an optical media access control unit 56 ("optical MAC unit 56"), a transport engine 57, a PWE3 module 58, a Time-Division Multiplexing (TDM) module 59 ("TDM module 59"), a management interface 60, and a framer line interface unit 62 ("framer LIU 62"). Optical MAC unit 56 represents a module that implements at least a portion of the data link layer, or layer 2, of the open systems interconnection (OSI) model. Optical MAC unit 56 may provide addressing and channel access control mechanisms that enable several subscriber devices, e.g., subscriber devices 26, to share a given fiber link, such as fiber link 53. Fiber link 53 couples ONT to an OLT, which may reside within remote terminal 14 or central office terminal 12. Optical MAC unit 56 may further convert physical layer signals to distinct data units, such as Ethernet frames encapsulated in the PWE3 protocol, in the downstream direction, as well as, convert these distinct data units to the physical layer signals in the upstream direction.

Transport engine 57 represents a transport engine that supports one or more optical transports, such as a GPON or Ethernet (e.g., AE) transport. PWE3 module 58 may comprise a module that receives Ethernet frames or packets encapsulated by the PWE3 protocol and convert these frames to data corresponding to native T1 services, such as T1 services 18N-18Z. Thus, PWE3 module 58 may comprise an Ethernet transport engine that converts Ethernet packets or, more generally, data 68 into the digital representation of the T1 service in accordance with a pseudo-wire emulation edge-to-edge (PWE3) protocol as implemented by an interworking module 64. PWE3 module 58 may therefore represent a module that implements the PWE3 protocol to provide both circuit emulation services and unstructured T1 across a network capable of carrying Ethernet, such as a GPON or AE network.

PWE3 module 58 may comprise an interworking module 64 that implements the PWE3 Inter-Working Function (IWF) in accordance with the PWE3 protocol. Interworking module 64 may also buffer data 68 to account for any packet delay variance or packet ordering issues that commonly occur on Ethernet networks (as a result of the asynchronous packet-switched nature of Ethernet networks). In the upstream direction, PWE3 module 58 may receive data corresponding to T1 services from subscriber devices 26 and convert those services into Ethernet packets encapsulated by the PWE3 protocol. ONT 30 may then transmit the Ethernet packets upstream to remote terminal 34 via optical fiber 53.

TDM module 59 represents a module that performs TDM in order to form T1 bitstreams and thereby provide either of synchronous T1 services 36N-36Z or asynchronous T1 services 48N-48Z. Management interface 60 represents an interface by which an administrator, via a remote provisioning system, a local terminal, or any other interface mechanism, may configure or provision ONT 30. In particular, management interface 60 presents the interface such that the administrator may selectively provision ONT 30 to deliver or provide a type of service to downstream subscriber devices coupled to ONT 30 via a line 65. Typically, an administrator interacts with a provisioning system, which in turn interacts with management interface 60 to selectively configure ONT 30. Management interface 60 therefore provides an interface by which an administrator may remotely and dynamically configure ONT 30 such that ONT 30 provides a given type of service.

In the example of FIG. 3, framer LIU 62 represents a module for framing data corresponding to the services for transmission over line 65, such as a copper wire, a coaxial cable, or a twisted-pair cable. Framer LIU 62 may frame, for example, data corresponding to T1 services according to a super frame (SF) framing scheme or an extended super frame (ESF) framing scheme. "Framing" refers to a technique for synchronizing frames, e.g., 193 bits in the case of a T1 frame, to identify delivery timeslots on the line channel. Framing ensures that each device, e.g., ONT 30 and subscriber devices 26, may identify the start and end of a particular portion of data corresponding to the T1 service. Framer LIU 62 may transmit data corresponding to T1 services via line 65 to one or more subscriber devices, such as subscriber devices 26. Framer LIU 62 may be configured to generate frames of different sizes for services other than T1 services.

Although not shown in FIG. 2, ONT 30 may include optical-to-electrical (O/E) and electrical-to-optical (E/O) converters that convert optical signals received as downstream transmissions via optical fiber link 53 to electrical signals, and convert electrical signals, including electrical received from subscriber devices via line 65, to optical signals for upstream transmission via fiber link 53. The O/E converter terminates the optical signals received via optical fiber link 53, and produces physical (PHY) layer signals. Optical MAC unit 56 may convert the PHY signals into the transport. For example, optical MAC unit 56 may convert the PHY signal into an Ethernet transport.

As further shown in the example of FIG. 3, control unit 54, in accordance with the techniques described herein, also includes above described clock mode selection module 46. Clock mode selection module 46 represents a module that dynamically determines the type of optical network to which ONT 30 connects via fiber link 53 and determines the type of service provided downstream to subscriber devices via line 65. Clock mode selection module 46 may, in determining the type of network, dynamically determine whether backbone network 16 is traceable, as demonstrated above with respect to FIG. 2. Clock mode selection module 46 may, again, in determining the type of network, also dynamically determine whether backbone network 16 is untraceable, as demonstrated above with respect to FIG. 2. Given this information regarding network type and service type, clock mode selection module 46 may automatically and dynamically select a clock recovery mode from a plurality of clock recovery modes. As described above, in some instances, clock mode selection module may select a most optimal clock recovery mode from the plurality of clock recovery modes based on the determined information.

For example, clock mode selection module 46 may initially detect, without any administrator input (e.g., "automatically"), a type of optical network to which ONT 30 couples via fiber link 53. Clock mode selection module 46 may, in other words, dynamically determine a transport used by ONT 30 to transmit data via fiber link 53. Particularly, clock mode selection module 46 may determine whether the network uses a GPON transport or an AE transport, as illustrated above with respect to GPON 44 and AE 52 of FIGS. 2A-2G. Clock mode selection module 46 may dynamically determine this type of transport based on transport data 66 received from transport engine 57. In this case, another component of ONT 30 may perform the detection of the type of optical network to which ONT 30 is coupled and provide the detected type to clock mode selection module 46, e.g., as transport data 66, which then dynamically determines, based on transport data 66, the type of transport used by ONT 30 to transmit data via fiber link 53.

For example, as described in U.S. patent application Ser. No. 12/121,283, filed May 15, 2008 by Biegert et al., entitled "OPTICAL NETWORK INTERFACE DEVICES AND METHODS," transport engine 57 may detect and/or determine the type of optical network to which ONT 22 is coupled by loading configurations to configure itself in accordance with different optical network protocols until ONT 22A is appropriately configured. In particular, transport engine 57 (or other component of ONT 22A) may load a first configuration to configure itself to support a first optical network protocol. Transport engine 57 may, for example, load the first configuration from a memory that stores a plurality of configurations that correspond with different optical network protocols. Transport engine 57 may load the first configuration upon being connected to optical fiber 11 of optical network 10 or, alternatively, when transport engine 57 is reconfiguring itself in response to a change in optical network protocols, e.g., upon detecting an unrecognized optical signal.

After loading the first configuration, transport engine 57 determines whether ONT 22A is appropriately configured. Transport engine 57 may determine whether ONT 22A is appropriately configured by comparing one or more protocol transmission requirements of the loaded optical network protocol with actual transmission characteristics of optical network 10. Transport engine 57 may, for example, compare actual or estimates of the actual transmission rates, e.g., bit rates, with expected transmission rates of the loaded configuration, packet structure of the received optical signals with the expected packet structure and the like.

If transport engine 57 determines that ONT 22A is appropriately configured, transport engine 57 continues to operate in accordance with the optical network protocol of the current configuration and provides transport data 66 to clock mode selection module 46. If, however, transport engine 57 determines that ONT 22A is not appropriately configured, transport engine 57 loads a second configuration to reconfigure itself to support a second optical network protocol. Transport engine 57 continues to load different MAC configurations until ONT determines that optical MAC unit is appropriately configured to operate in accordance with the optical network protocol of the optical network to which ONT 22A is connected. In this manner, transport engine 57 may implement a transport discovery protocol that allows transport engine 57 to automatically discover the type of optical network to which ONT 22A has been connected.

Typically, at some later point in time after determining the type of optical network to which ONT 30 couples via fiber link 53, clock mode selection module 46 may determine a type of service ONT 30 provides or delivers downstream via line 65 to subscriber devices. Often, an administrator either directly or indirectly (via a provisioning system) interacts with management interface 60 to configure a type of TDM service, which management interface 60 forwards to clock mode selection module 46, which is shown in FIG. 3 as service configuration 70A ("service config 70A"). Management interface 60 also provides service configuration information to TDM module 59, which is shown in FIG. 3 as service configuration 70B ("service config 70B"). Service config 70A and 70B may, for example, identify whether the type of TDM service is synchronous or asynchronous.

Clock mode selection module 46 may then determine, based on the type of optical network, e.g., GPON or AE, as identified by transport data 66 and type of service, e.g., synchronous or asynchronous, as identified by service config 70A, a most optimal clock recovery mode. As described above, clock mode selection module 46 may maintain either an SSM aging table 72 or an RTP aging table 74, or in some instances both by which to further determine or resolve the type of network. As described above, in determining the type of network, clock mode selection module 46 may determine whether a backbone network 16 is traceable, e.g., traceable network 38, or untraceable, e.g., untraceable network 50. Based on these three criteria or a subset of the criteria, clock mode selection module 46 may, in some instances, then determine whether the network supports differential timing, which as described above may involve RTP messages and RTP aging table 74. Based on the SSM and RTP messages, ONT 30 may further resolve the type of network, and based on this resolved type of network and the type of service, automatically determine which of the three clock recovery modes represents an optimum clock recovery mode by which to recover a service clock from a network or local clock, such as local clock 76.

The following Table 1 presents one example of the clock recovery modes (CRM) that are selected based on the type of optical network, type of service and traceability.

TABLE 1

| CRM | Type of Optical Network | Type of Service | Traceability | Differential Support |
|---|---|---|---|---|
| Line Timing | GPON | Synchronous | Traceable | N/A |
| Adaptive | GPON | Synchronous | Untraceable | N/A |
| Differential | GPON | Asynchronous | Traceable | YES |
| Adaptive | GPON | Asynchronous | Untraceable | NO |
| Line Timing | AE | Synchronous | Traceable | N/A |
| Adaptive | AE | Synchronous | Untraceable | N/A |
| Differential | AE | Asynchronous | Traceable | YES |
| Adaptive | AE | Asynchronous | Untraceable | NO |

Table 1 above includes a first row defining headers for each of the columns of Table 1. The first column is designated as "CRM" and represents the clock recovery mode selected given the following for column variables, e.g., "Type of Optical Network," "Type of Service,""Traceability," and "Differential Support." If, for example, the type of optical network is GPON, the type of service is synchronous T1 service, the traceability, e.g., of backbone network 16, is traceable, and support for differential timing is not applicable ("N/A") to the clock mode selection decision (as shown in the second row of table 1), clock mode selection module 46 may select line timing, as described above with respect to FIG. 2A.

The third row of Table 1 indicates that if, as another example, the type of network is GPON, the type of service is synchronous T1 service, the traceability of the network is untraceable and support for differential timing is not applicable ("N/A"), clock mode selection module 46 may select the adaptive clock recovery mode. The N/A designation in the above Table 1 reflects that, in some respect, whether the network supports differential timing is not applicable to the selection of a clock recovery mode. In other words, whether the network supports differential timing may not impact selection of a suitable clock recovery mode. Each of the remaining rows 4-8 may correspond respectively to the description of FIGS. 2B-2G.

In any event, clock mode selection module 46 may determine a clock recovery mode, e.g., a most optimal clock recovery mode, and configure PWE3 module 58 and TDM module 59 to implement this dynamically selected clock recovery mode. Clock mode selection module 46 may output a PWE3 configuration 78 ("PWE3 config 78") and a TDM configuration 80 ("TDM config 80") to respective PWE3 module 58 and TDM module 59 that configures each of these modules 58, 59 to implement the dynamically selected clock recovery mode.

Implementing the selected clock recovery mode may involve one or more various clocks received and/or output by transport engine 57. In particular, transport engine 57 may receive transport clock 82, which transport engine 57 then resolves into one or more of differential clock information 84 ("diff clock 84") and line clock 86. Transport engine 57 may pass differential clock 84 to interworking module 64 of PWE3 module 58 and line clock 86 to a clock multiplexer 88 ("clock mux 88") of TDM module 59. TDM module 59 may include clock mux 88 to multiplex either of line clock 86 or a clock received by PWE3 module 58, e.g., recovered clock 90. Interworking module 64 may generate recovered clock 90 based on local clock 76, differential clock information 84 and/or TDM clock 92. TDM clock 92 may represent a clock selected by clock mux 88. In this respect, interworking module 64 may comprise a phase locked loop clock in that recovered clock 90 is generated using a loop from interworking module 64 to TDM module 59 and back to interworking module 64.

As an example, assuming clock mode selection module 46 selects the line timing clock recovery mode as the clock recovery mode, clock mode selection module 46 may generate and output TDM configuration 80 to configure clock mux 88 to select line clock 86. Clock mux 88 thereafter outputs line clock 86 as TDM clock 92 to a transceiver 94 included within TDM module 59. TDM module 59 may include transceiver 94 to transmit and receive TDM bitstreams, such as bitstream 96 received from interworking module 64. Transceiver 94 may comprise both a transmitter and a receiver (hence the name transceiver as a combination of TRANSmitter and reCEIVER) both of which are clocked according to TDM clock 92. In this manner, data 68 received and processed by PWE3 module 58 to generate bitstream 96 may be transmitted by transceiver 94 according to a TDM clock 92 recovered in accordance with the line timing clock recovery mode.

In another example, assuming clock mode selection module 46 selects the differential clock recovery mode as the clock recovery mode, clock mode selection module 46 may generate and output TDM configuration 80 to configure clock mux 88 to select recovered clock 90. Clock mode selection module 46 may also generate and output PWE3 configuration 78 to configure interworking module 64 to generate recovered clock 90 as a function of both differential clock 84 and local clock 76, as well as, take into consideration TDM clock 92.

Thereafter, transport engine 57 may output differential clock 84 to interworking module 64, which in turn generates recovered clock 90 based on differential clock 84 and packet information. In the downstream direction, interworking module 64 may process packets or data 68, where each of the packets of data 68 includes a timestamp and port information (often in a header of the packet). Interworking module 68 may utilize the timestamp information to generate a recovered T1 clock and the port information to channel the TDM data to the correct location. In the upstream direction, interworking module 68 may add the timestamp and port information to a received TDM bitstream to create Ethernet packets. In this manner, interworking module 68 may generate or recover, in the downstream direction, recovered clock 90.

Clock mux 88 may then select and pass through recovered clock 90 as TDM clock 92, which transceiver 94 utilizes to clock bitstream 96. In this manner, data 68 received and processed by PWE3 module 58 to generate bitstream 96 may be transmitted by transceiver 94 according to a TDM clock 92 recovered in accordance with the differential clock recovery mode.

In yet another example, assuming clock mode selection module 46 selects the adaptive clock recovery mode as the clock recovery mode, clock mode selection module 46 may generate and output TDM configuration 80 to configure clock mux 88 to select recovered clock 90. Clock mode selection module 46 may also generate and output PWE3 configuration 78 to configure interworking module 64 to generate recovered clock 90 as a function of local clock 76, as well as, TDM clock 92. In other words, PWE3 configuration 78 may indicate the clock recovery type or mode, e.g., differential or adaptive clock recover mode, and interworking module 64 may recover the clock according to the indicated clock recovery mode. Thereafter, interworking module 64 may adaptively recover the clock based on local clock 76 and/or differential clock 84 to generate recovered clock 90. Clock mux 88 may then select and pass through recovered clock 90 as TDM clock 92, which transceiver 94 utilizes to clock bitstream 96. In this manner, data 68 received and processed by PWE3 module 58 to generate bitstream 96 may be transmitted by transceiver 94 according to a TDM clock 92 recovered in accordance with the adaptive clock recovery mode.

Regardless of the clock recovery mode used to output bitstream 96, transceiver outputs a clocked bitstream 98 to framer LIU 62, which frames the clocked bitstream 98. Framer LIU 62 may then output the T1 frames in accordance with the provisioned type of service to downstream subscriber devices 26 via line 65. In this manner, ONT 30 may deliver services downstream to subscriber devices 26. While described with respect to delivering or providing services downstream, the techniques may be substantially similar to receive and deliver upstream T1 service transmissions.

Furthermore, while described as "automatically" performing various operations in this disclosure, the various components described in this disclosure that perform these automatic operations may be configured to perform these operations. In this sense, the automatic operation occurs as a result of this configuration. Thus, the clock recovery mode, for example, may be configured to automatically select a clock recovery mode based on the type of network and the type of service.

Moreover, while described with respect to modules, engines, units, elements or other functional components, each of these modules, engines, units, elements, or other functional components may comprise hardware and/or software. For example, clock mode selection module 46 may comprise a programmable processor, while transport engine 57 may comprise a Field Programmable Gate Array (FPGA). Further, PWE3 module 58 may comprise either a FPGA, an Application Specific Standard Product (ASSP), which is a form of Integrated Circuit (IC), or an Application Specific Integrated Circuit (ASIC). Further, TDM module 59 may comprise an FPGA as well.

Figure 4:
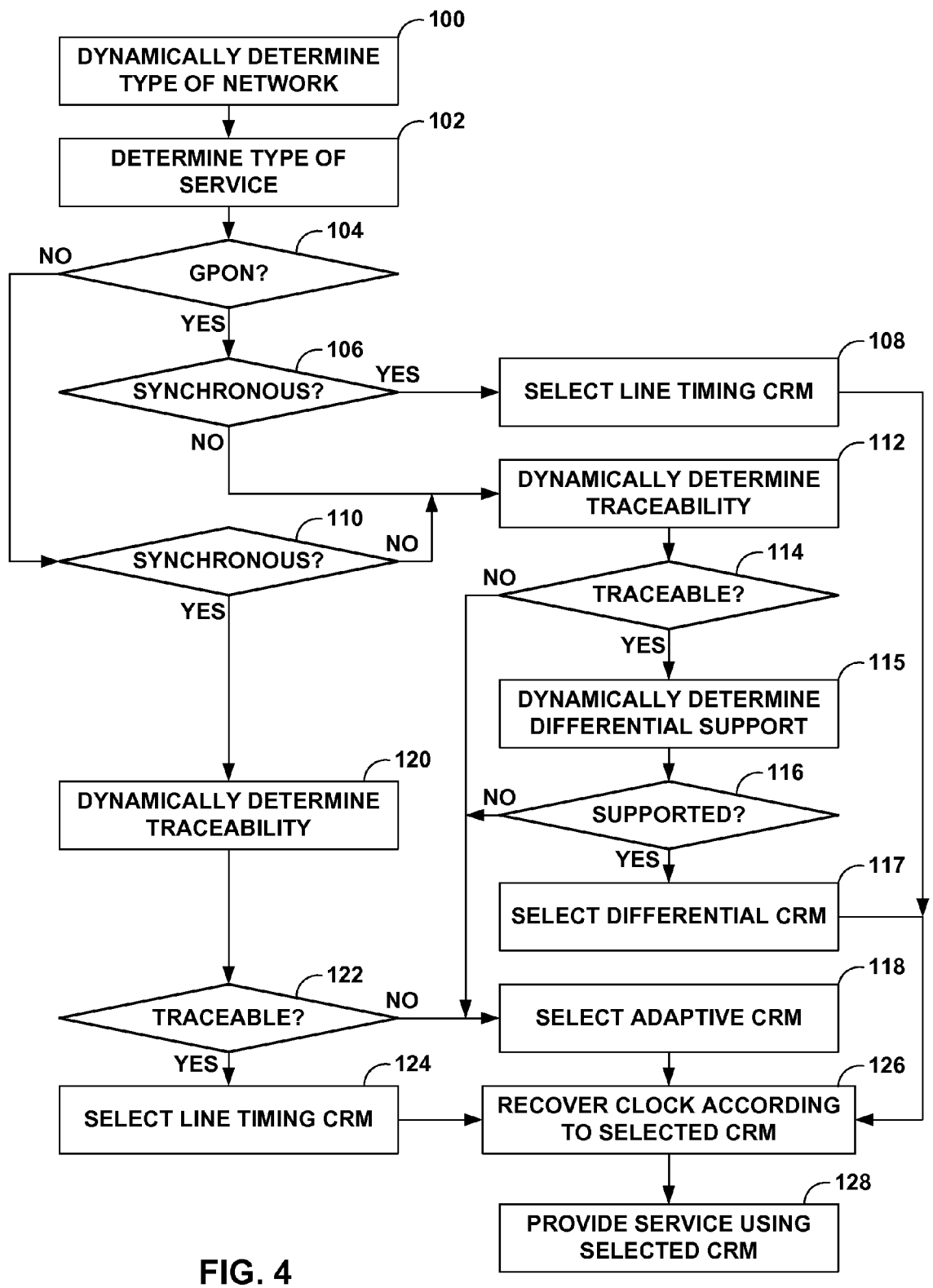
FIG. 4 is a flowchart illustrating example operation of an optical network terminal in performing the techniques described in this disclosure.

FIG. 4 is a flowchart illustrating example operation of an optical network terminal, e.g., ONT 30 or ONT 22, in performing the techniques described in this disclosure. While described below with respect to a particular network device, an ONT 30 of FIG. 3, any network device capable of recovering a clock according to one of a plurality of clock recovery modes may implement the techniques described in this disclosure.

Initially, a user or technician may install ONT 30 at a customer's premises or at some other location and activate or otherwise power on or start ONT 30. ONT 30 may, after being powered up, dynamically determine the type of optical network to which ONT 30 couples (100). That is, transport engine 57 of ONT 30 may dynamically determine the type of optical network to which ONT 30 couples via fiber link 53 and transmit this type of optical network as transport data 66 to clock mode selection module 46. In the example illustrated the flowchart of FIG. 4, ONT 30 determines whether the type of optical network is GPON or AE. Although described with respect to these two types of optical networks, the techniques of this disclosure may be used to determine any type of optical network in addition to or instead of GPON and AE.

Often, deployment of ONT 30 may occur prior to any customer or other end-user activating or subscribing to a service. For example, a service provider may lay fiber cables or links and install ONTs in a new development and at some later point in time after the new development has been completed, a customer may enable a particular service. A network administrator or other user may then provision ONT 30 to provide this service. In particular, the administrator may interact, either directly or indirectly, with a user interface presented by management interface 60 to provision the type of service, e.g., a synchronous or asynchronous T1 service. Clock mode selection module 46 may receive this type of service as service configuration information 70A from management interface 60. In this manner, clock mode selection module 46 may determine the type of service ONT 30 is provisioned to provide to downstream subscriber via line 65 (102).

Once provisioned, clock mode selection module 46 may then dynamically select a Clock Recovery Mode (CRM) and, in some instances, an optimal clock recovery mode from a plurality of clock recovery modes, in the manner described above. For example, clock mode selection module 46 may determine, based on transport data 66, whether the type of optical network is a GPON (104). If determined to be a GPON ("YES" 104), clock mode selection module 46 may, based on service config 70A, determine whether the type of service is a synchronous T1 service (106). If determined to be synchronous ("YES" 106"), clock mode selection module 46 may select the line timing CRM, as described above and shown in Table 1 (108).

While described above as automatically defaulting to the line timing CRM in this instance, clock mode selection module 46 may not automatically select the line timing CRM, but may instead perform additional steps similar to those described below in response to determining the network is an AE network and determining that the type of service is synchronous T1 service. That is, as described above with respect to FIG. 2B, clock mode selection module 46 may determine first whether the network is traceable prior to choosing the line timing clock recovery mode. If traceable, clock mode selection module 46 may then select the line timing clock recovery mode. If not traceable, clock mode selection module 46 may select the adaptive clock selection mode. In this respect, the techniques may not differentiate between the type of network generally, as in a GPON or AE network, but instead, the type of network may refer to whether the network is traceable or not and whether the network supports differential timing or not. Thus, the techniques may be further abstracted in this manner to accommodate different embodiments not described in detail herein.

However, if not determined to be a synchronous type of service ("NO" 106"), or if determined not to be a GPON network ("NO" 104") and also not a synchronous type of service ("NO" 110), clock mode selection module 46 may further resolve the type of network by dynamically determining a traceability of the network system (112). For example, clock mode selection module 46 may determine, for a GPON type of optical network, whether a GPON is traceable by monitoring communications arriving at ONT 30 via fiber link 53 for SSM messages. If the SSM messages arrive before an SSM aging timeout as indicated by SSM aging table 72, clock mode selection module 46 may determine that the GPON is traceable and then further resolve the type of network by dynamically determining whether the GPON network supports differential timing ("YES" 114, 115).

For example, clock mode selection module 46 may determine, for a GPON type of optical network, whether a GPON supports differential timing by monitoring communications arriving at ONT 30 via fiber link 53 for RTP timestamps. If the RTP timestamps arrive before an RTP aging timeout as indicated by RTP aging table 74, clock mode selection module 46 may determine that the GPON is traceable and select the differential CRM ("YES" 116, 117). If, however, the one or more SSM messages do not arrive prior to an SSM timeout as indicated by SSM aging table 72, clock mode selection module 46 may determine that the network is not traceable or "untraceable" and select the adaptive CRM ("NO" 114, 118.

Alternatively, if determined to be traceable ("YES" 114), but if the one or more RTP timestamps do not arrive prior to an RTP aging timeout as indicated by the RTP aging table 74, clock mode selection module 46 may determine that the network does not support differential timing and select the adaptive CRM ("NO" 116, 118).

Similarly, for an AE network with an asynchronous T1 type of service, clock mode selection module 46 may determine the traceability based on the SSM aging table 72 (112). If the SSM messages arrive prior to SSM aging timeouts, as indicated by SSM and aging table 72, clock mode selection module 46 may determine that the network is traceable ("YES" 114). Next, clock mode selection module 46 may dynamically determine the differential support of the network based on RTP timestamps and RTP aging table 74, as described above (115). If supported ("YES" 116), clock mode selection module 46 may select the differential CRM (117). However, if, similar to above, either or both of the SSM messages and RTP timestamps do not arrive prior to the SSM and/or RTP aging timeouts (either of "NO" 114 or "NO" 116), clock mode selection module 46 may determine that the network is either untraceable or traceable but does not support differential timing and select the adaptive CRM (118). Again, each of these various selections are described in detail above and summarized by table 1.

Clock mode selection module 46 may also, based on a determination that the type of optical network is not GPON ("NO" 104) but a determination that the network is synchronous ("YES" 110), determine the traceability of the AE network (120). Clock mode selection module 46 may base the determination of traceability, in this instance, only on SSM messages. If the SSM messages arrive before an SSM aging timeout as indicated by SSM aging table 72 (FIG. 3), clock mode selection module 46 may determine that the network is traceable and select the line timing CRM ("YES" 122, 124). As above, if not traceable or untraceable, clock mode selection module 46 may select the adaptive CRM (118).

Regardless of the one of the plurality of CRMs selected, clock mode selection module 46 may issue, update, configure or otherwise cause PWE3 module 58 and/or TDM module 59 to recover the service clock using the automatically and dynamically selected CRM (126). In example ONT 30 of FIG. 3, clock mode selection module 46 may transmit PWE3 configuration information 78 and TDM configuration information 80 to PWE3 module 58 and TDM module 59, respectively, to configure these modules 58, 59 to recover the service clock according to the selected CRM. After recovering the clock, TDM module 59 and more particularly, transceiver 94 may delivery a clocked bitstream to framer LIU 62, which in turn provides the provisioned service according to the recovered service clock via line 65 to downstream subscriber devices (128).

In this manner, a network device, such as ONT 30, may automatically and dynamically determine and implement a most optimal clock recover mode. Administrators and other users, given the dynamic and automatic manner in which ONT 30 selects the most optimal clock recovery mode, may no longer require detailed training regarding the specifics of provision an ONT to perform a particular CRM. ONTs 30 may therefore be considered "plug-in-play" with respect to clock recovery mode provisioning. This automatic provisioning may further reduce if not eliminate improper clock recovery mode provisioning of ONTs that implement the techniques described herein.

While described above as automatically selecting and provisioning an optimal clock recovery mode, an administrator or other user may override these automatic provisioning processes to manually provision a clock recovery mode. In other words, ONT 30 may enable manual configuration of the CRM and the techniques should not be construed as limiting the provisioning of a clock recovery mode to strictly automatic CRM provisioning. Moreover, clock recovery modes in addition to or instead of line timing, differential timing and adaptive timing may be used.

Figure 5:
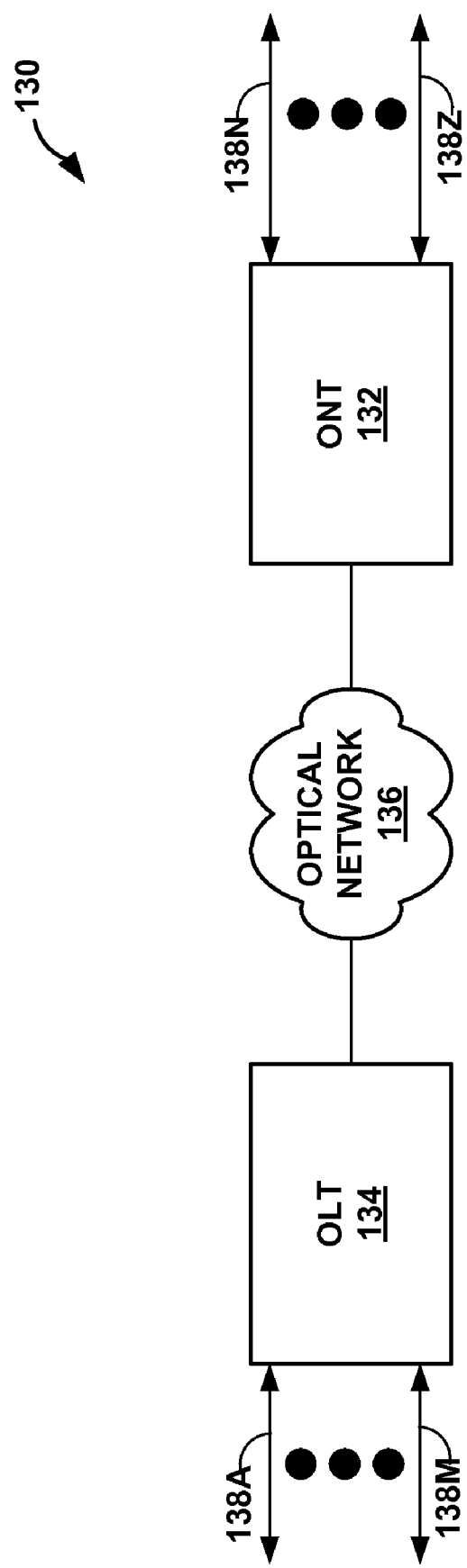
FIG. 5 is a block diagram illustrating an exemplary network system in which an optical network terminal implements the techniques described in this disclosure.

FIG. 5 is a block diagram illustrating an exemplary network system 130 in which an optical network terminal (ONT) 132 implements the techniques described herein. As shown in FIG. 5, network system 130 includes an optical line terminal (OLT) 134 ("OLT 134") and ONT 132, where OLT 134 terminates one end of optical network 136 and ONT 132 terminates another end of optical network 136. OLT 134 therefore couples to ONT 132 via optical network 136. Optical network 136 may comprise a passive optical network, such as a GPON, or an active optical network, such as an AE network. OLT 134 may reside within a central office terminal or a remote terminal, while ONT 132 may reside at a customer's premises or at least proximate to a customer, such as curb-side.

OLT 134 may receive T1 services 138A-138M clocked according to a service clock and transmit these T1 services 138A-138M via optical network 136 according to a network clock. ONT 132 may implement the techniques described above with respect to ONT 30 to automatically select a most optimal clock recovery mode by which to recover the service clock from the network clock. ONT 132 may, after selecting the most optimal clock recovery mode, deliver T1 services 138N-138Z in accordance with the recovered clock. In this manner, any network system that includes an OLT, an ONT and an optical network may implement the techniques described herein to automatically, without administrator oversight, provision an ONT, such as ONT 132, with a most optimal clock recovery mode.

The techniques described herein may be implemented in hardware, software, firmware, or any combination thereof. Any features described as modules, units or components may be implemented together in an integrated logic device or separately as discrete but interoperable logic devices. In some cases, various features may be implemented as an integrated circuit device, such as an integrated circuit chip or chipset. If implemented in software, the techniques may be realized at least in part by a computer-readable storage or other medium comprising instructions that, when executed, cause a processor to perform one or more of the methods described above.

A computer-readable medium may form part of a computer program product, which may include packaging materials. A computer-readable medium may comprise a computer data storage medium such as random access memory (RAM), synchronous dynamic random access memory (SDRAM), read-only memory (ROM), non-volatile random access memory (NVRAM), electrically erasable programmable read-only memory (EEPROM), FLASH memory, magnetic or optical data storage media, and the like. The techniques additionally, or alternatively, may be realized at least in part by a computer-readable communication medium that carries or communicates code in the form of instructions or data structures and that can be accessed, read, and/or executed by a computer.

The code or instructions may be executed by one or more processors, such as one or more DSPs, general purpose, microprocessors, ASICs, field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated software modules or hardware modules. The disclosure also contemplates any of a variety of integrated circuit devices that include circuitry to implement one or more of the techniques described in this disclosure. Such circuitry may be provided in a single integrated circuit chip or in multiple, interoperable integrated circuit chips in a so-called chipset. Such integrated circuit devices may be used in a variety of applications.

Various embodiments have been described in this disclosure. These and other embodiments are within the scope of the following claims.

The invention claimed is:

1. A method comprising:
   automatically determining, with an optical network terminal, a type of optical network to which the optical network terminal connects;
   determining, with the optical network terminal, a type of service provided by the optical network terminal to one or more subscriber devices coupled to the optical network terminal; and
   automatically selecting, with the optical network terminal, from a plurality of clock recovery modes, a clock recovery mode as a most optimal clock recovery mode by which to recover a service clock from a network clock based on the determined type of optical network and the determined type of service.

2. The method of claim 1, wherein determining the type of optical network comprises determining a traceability of the optical network, and
   wherein automatically selecting, from the plurality of clock recovery modes, the most optimal clock recovery mode by which to recover the service clock from the network clock comprises automatically selecting, with the optical network terminal, from the plurality of clock recovery modes, the clock recovery mode as the most optimal clock recovery mode by which to recover the service clock from the network clock based on the determined type of optical network including the determined traceability of the optical network and the determined type of service.

3. The method of claim 2, wherein determining the traceability comprises:
   maintaining a Synchronization Status Messaging (SSM) aging table that indicates an SSM aging timeout;
   monitoring downstream communications for an SSM message; and
   determining the traceability of the network depending on whether the SSM message arrives prior to the SSM aging timeout.

4. The method of claim 3, wherein determining the type of optical network further comprises:
   maintaining a Real-time Transport Protocol (RTP) aging table that indicates an RTP aging timeout;
   monitoring, in response to the determination that the network is traceable, downstream communications for an RTP timestamp; and
   determining whether the optical network supports differential timing based on whether the RTP timestamp arrives prior to the RTP aging timeout.

5. The method of claim 1, wherein determining the type of optical network comprises determining whether the optical network supports differential timing, and
   wherein automatically selecting, with the optical network terminal, from the plurality of clock recovery modes, the clock recovery mode comprises automatically selecting, with the optical network terminal, from the plurality of clock recovery modes, the clock recovery mode as the most optimal clock recovery mode by which to recover the service clock from the network clock based on the determined type of optical network including the determined support of the differential timing within the optical network and the determined type of service.

6. The method of claim 5, wherein determining whether the optical network supports the differential timing comprises:
   maintaining a Real-time Transport Protocol (RTP) aging table that indicates an RTP aging timeout;
   monitoring downstream communications for an RTP timestamp; and
   determining whether the optical network supports differential timing based on whether the RTP timestamp arrives prior to the RTP aging timeout.

7. The method of claim 1, wherein automatically determining the type of optical network comprises determining whether the optical network is one of a passive optical network (PON) or an active optical network,
   wherein determining the type of service comprises determining whether the type of service is an asynchronous T1 service or a synchronous T1 service, and
   wherein automatically selecting, with the optical network terminal, from the plurality of clock recovery modes, the clock recovery mode as the most optimal clock recovery mode by which to recover the service clock from the network clock comprises automatically selecting, with the optical network terminal, from the plurality of clock recovery modes, the clock recovery mode as the most optimal clock recovery mode by which to recover the service clock from the network clock from a plurality of clock recovery modes that include at least a line timing clock recovery mode, a differential clock recovery mode and an adaptive clock recovery mode based on the type of service and the type of network.

8. The method of claim 7,
   wherein determining the type of optical network comprises:
   determining whether the optical network is traceable; and
   determining whether the optical network supports differential timing, and
   wherein automatically selecting, from the plurality of clock recovery modes, the clock recovery mode comprises:
   selecting the line timing clock recovery mode as the clock recovery mode based on the determination that the type of optical network is the passive optical network and the type of service is the synchronous T1 service and the determination that the optical network is traceable;
   selecting the line timing clock recovery mode, from the plurality of clock recovery modes, as the most optimal clock recovery mode by which to recover the service clock from the network clock based on the determination that the type of optical network is the active optical network, the determination that the type of service is the synchronous T1 service and the determination that the optical network is traceable;
   selecting the adaptive clock recovery mode as the most optimal clock recovery mode by which to recover the service clock from the network clock based on the determination that the type of optical network is the passive optical network, the determination that the type of service is the synchronous T1 service and the determination that the optical network is untraceable;
   selecting the adaptive clock recovery mode as the most optimal clock recovery mode by which to recover the service clock from the network clock based on the determination that the type of optical network is the active optical network, the determination that the type of service is the synchronous T1 service and the determination that the optical network is untraceable;

selecting the differential clock recovery mode as the most optimal clock recovery mode by which to recover the service clock from the network clock based on the determination that the type of optical network is the passive optical network, the determination that the type of service is the asynchronous T1 service, the determination that the optical network is traceable, and the determination that the optical network supports differential timing;

selecting the differential clock recovery mode as the most optimal clock recovery mode by which to recover the service clock from the network clock based on the determination that the type of optical network is the active optical network, the determination that the type of service is the asynchronous T1 service, the determination that the optical network is traceable, and the determination that the optical network supports differential timing;

selecting the adaptive clock recovery mode as the most optimal clock recovery mode by which to recover the service clock from the network clock based on (i) the determination that the type of optical network is the passive optical network, (ii) the determination that the type of service is the asynchronous T1 service and (iii) the determination that the optical network is untraceable or the determination that the optical network does not support differential timing; and selecting the adaptive clock recovery mode as the most optimal clock recovery mode by which to recover the service clock from the network clock based on (i) the determination that the type of optical network is the active optical network, (ii) the determination that the type of service is the asynchronous T1 service and (iii) the determination that the optical network is untraceable or the determination that the optical network does not support differential timing.

9. The method of claim 1, further comprising:
recovering a clock by which to deliver the determined type of service according to the automatically selected most optimal clock recovery mode; and
delivering the determined type of service in accordance with the recovered clock.

10. The method of claim 1, wherein determining the type of optical network comprises determining whether the type of optical network is a Gigabit Passive Optical Network (GPON) or an Active Ethernet (AE) network.

11. An optical network terminal that terminates a fiber link of an optical network, the optical network terminal comprising:
a clock mode selection module that automatically determines, a type of the optical network to which the optical network terminal connects; and
a management interface that determines a type of service to provide to one or more subscriber devices coupled to the optical network terminal,
wherein the clock mode selection module further automatically selects, from a plurality of clock recovery modes, a clock recovery mode as a most optimal clock recovery mode by which to recover a service clock from a network clock, based on the determined type of optical network and the determined type of service.

12. The optical network terminal of claim 11, wherein the clock mode selection module further determines a traceability of the optical network, and automatically selects, from the plurality of clock recovery modes, the clock recovery mode as the most optimal clock recovery mode by which to recover the service clock from the network clock based on the determined type of optical network, the determined type of service and the determined traceability of the optical network.

13. The optical network terminal of claim 12, wherein the clock mode selection module (1) maintains a Synchronization Status Messaging (SSM) aging table that indicates an SSM aging timeout, (2) monitors downstream communications for an SSM message and (3) determines the traceability of the network depending on whether the SSM message arrives prior to the SSM aging timeout.

14. The optical network terminal of claim 13, wherein the clock mode selection module further (1) maintains a Real-time Transport Protocol (RTP) aging table that indicates an RTP aging timeout, (2) monitors, in response to the determination that the network is traceable, downstream communications for an RTP timestamp and (3) determines whether the optical network supports differential timing based on whether the RTP timestamp arrives prior to the RTP aging timeout.

15. The optical network terminal of claim 11, wherein the clock mode selection module further determines whether the optical network supports differential timing and automatically selects, from the plurality of clock recovery modes, the clock recovery mode as the most optimal clock recovery mode by which to recover the service clock from the network clock based on the determined type of optical network including the determined support of the differential timing within the optical network and the determined type of service.

16. The optical network terminal of claim 15, wherein the clock mode selection module further (1) maintains a Real-time Transport Protocol (RTP) aging table that indicates an RTP aging timeout, (2) monitors downstream communications for an RTP timestamp and (3) determines whether the optical network supports differential timing based on whether the RTP timestamp arrives prior to the RTP aging timeout.

17. The optical network terminal of claim 11, wherein the clock mode selection module automatically determines whether the optical network is one of a passive optical network (PON) or an active optical network, determines whether the type of service is an asynchronous T1 service or a synchronous T1 service, and automatically selects, from the plurality of clock recovery modes, the clock recovery mode as the most optimal clock recovery mode by which to recover the service clock from the network clock, and wherein the plurality of clock recovery modes includes a line timing clock recovery mode, a differential clock recovery mode and an adaptive clock recovery mode based on the type of service and the type of network.

18. The optical network terminal of claim 17, wherein the clock mode selection module determines whether the optical network is traceable, determines whether the optical network supports differential timing, and (1) selects, from the plurality of clock recovery modes, the line timing clock recovery mode as the most optimal clock recovery mode by which to recover the service clock from the network clock based on the determination that the type of optical network is the passive optical network and the type of service is the synchronous T1 service and the determination that the optical network is traceable, (2) selects, from the plurality of clock recovery modes, the line timing clock recovery mode as the most optimal clock recovery mode by which to recover the service clock from the network clock based on the determination that the type of optical network is the active optical network, the determination that the type of service is the synchronous T1 service and the determination that the optical network is traceable, (3)

selects, from the plurality of clock recovery modes, the adaptive clock recovery mode as the most optimal clock recovery mode by which to recover the service clock from the network clock based on the determination that the type of optical network is the passive optical network, the determination that the type of service is the synchronous T1 service and the determination that the optical network is untraceable, (4) selects, from the plurality of clock recovery modes, the adaptive clock recovery mode as the most optimal clock recovery mode by which to recover the service clock from the network clock based on the determination that the type of optical network is the active optical network, the determination that the type of service is the synchronous T1 service and the determination that the optical network is untraceable, (5) selects, from the plurality of clock recovery modes, the differential clock recovery mode as the most optimal clock recovery mode by which to recover the service clock from the network clock based on the determination that the type of optical network is the passive optical network, the determination that the type of service is the asynchronous T1 service, the determination that the optical network is traceable, and the determination that the optical network supports differential timing (6) selects, from the plurality of clock recovery modes, the differential clock recovery mode as the most optimal clock recovery mode by which to recover the service clock from the network clock based on the determination that the type of optical network is the active optical network, the determination that the type of service is the asynchronous T1 service, the determination that the optical network is traceable and the determination that the optical network supports differential timing (7) selects, from the plurality of clock recovery modes, the adaptive clock recovery mode as the most optimal clock recovery mode by which to recover the service clock from the network clock based on (i) the determination that the type of optical network is the passive optical network, (ii) the determination that the type of service is the asynchronous T1 service and (iii) the determination that the optical network is untraceable, or the determination that the optical network does not support differential timing and (8) selects, from the plurality of clock recovery modes, the adaptive clock recovery mode as the most optimal clock recovery mode by which to recover the service clock from the network clock based on (i) the determination that the type of optical network is the active optical network, (ii) the determination that the type of service is the asynchronous T1 service and (iii) the determination that the optical network is untraceable or the determination that the optical network does not support differential timing.

19. The optical network terminal of claim 11, further comprising:
a protocol module that recovers a clock by which to deliver the determined type of service according to the automatically selected most optimal clock recovery mode; and
a Time Division Multiplexing module and a framer line interface unit that deliver the determined type of service in accordance with the recovered clock.

20. The optical network terminal of claim 11, wherein the clock mode selection module further determines whether the type of optical network is a Gigabit Passive Optical Network (GPON) or an Active Ethernet (AE) network.

21. A network system comprising:
an optical network;
an optical network terminal that terminates a fiber link of the optical network; and
an optical line terminal that couples to the optical network terminal via the optical network,
wherein the optical network comprises:
a clock mode selection module that automatically determines, a type of the optical network to which the optical network terminal connects; and
a management interface that determines a type of service to provide to one or more subscriber devices coupled to the optical network terminal,
wherein the clock mode selection module further automatically selects, from a plurality of clock recovery modes, a clock recovery mode as a most optimal clock recovery mode by which to recover a service clock from a network clock, based on the determined type of optical network and the determined type of service.

22. The network system of claim 21, wherein the clock mode selection module further determines a traceability of the optical network, and automatically selects, from the plurality of clock recovery modes, the most optimal clock recovery mode by which to recover the service clock from the network clock based on the determined type of optical network, the determined type of service and the determined traceability of the optical network.

23. The network system of claim 22, wherein the clock mode selection module (1) maintains a Synchronization Status Messaging (SSM) aging table that indicates an SSM aging timeout, (2) monitors downstream communications for an SSM message and (3) determines the traceability of the network depending on whether the SSM message arrives prior to the SSM aging timeout.

24. The network system of claim 23, wherein the clock mode selection module further (1) maintains a Real-time Transport Protocol (RTP) aging table that indicates an RTP aging timeout, (2) monitors, in response to the determination that the network is traceable, downstream communications for an RTP timestamp and (3) determines whether the optical network supports differential timing based on whether the RTP timestamp arrives prior to the RTP aging timeout.

25. The network system of claim 21, wherein the clock mode selection module further determines whether the optical network supports differential timing and automatically selects, from the plurality of clock recovery modes, the most optimal clock recovery mode by which to recover the service clock from the network clock based on the determined type of optical network including the determined support of the differential timing within the optical network and the determined type of service.

26. The network system of claim 25, wherein the clock mode selection module further (1) maintains a Real-time Transport Protocol (RTP) aging table that indicates an RTP aging timeout, (2) monitors downstream communications for an RTP timestamp and (3) determines whether the optical network supports differential timing based on whether the RTP timestamp arrives prior to the RTP aging timeout.

27. The network system of claim 21, wherein the clock mode selection module automatically determines whether the optical network is one of a passive optical network (PON) or an active optical network, determines whether the type of service is an asynchronous T1 service or a synchronous T1 service, and automatically selects, from the plurality of clock recovery modes, the most optimal clock recovery mode by which to recover the service clock from the network clock, and wherein includes a line timing clock recovery mode, a differential clock recovery mode and an adaptive clock recovery mode based on the type of service and the type of network.

28. The optical network terminal of claim 27, wherein the clock mode selection module determines whether the optical network is traceable, determines whether the optical network supports differential timing, and (1) selects, from the plurality of clock recovery modes, the line timing clock recovery mode at the most optimal clock recovery mode by which to recover the service clock from the network clock based on the determination that the type of optical network is the passive optical network and the type of service is the synchronous T1 service and the determination that the optical network is traceable, (2) selects, from the plurality of clock recovery modes, the line timing clock recovery mode as the most optimal clock recovery mode by which to recover the service clock from the network clock based on the determination that the type of optical network is the active optical network, the determination that the type of service is the synchronous T1 service and the determination that the optical network is traceable, (3) selects, from the plurality of clock recovery modes, the adaptive clock recovery mode as the most optimal clock recovery mode by which to recover the service clock from the network clock based on the determination that the type of optical network is the passive optical network, the determination that the type of service is the synchronous T1 service and the determination that the optical network is untraceable, (4) selects, from the plurality of clock recovery modes, the adaptive clock recovery mode as the most optimal clock recovery mode by which to recover the service clock from the network clock based on the determination that the type of optical network is the active optical network, the determination that the type of service is the synchronous T1 service and the determination that the optical network is untraceable, (5) selects, from the plurality of clock recovery modes, the differential clock recovery mode as the most optimal clock recovery mode by which to recover the service clock from the network clock based on the determination that the type of optical network is the passive optical network, the determination that the type of service is the asynchronous T1 service, the determination that the optical network is traceable, and the determination that the optical network supports differential timing (6) selects, from the plurality of clock recovery modes, the differential clock recovery mode as the most optimal clock recovery mode by which to recover the service clock from the network clock based on the determination that the type of optical network is the active optical network, the determination that the type of service is the asynchronous T1 service, the determination that the optical network is traceable and the determination that the optical network supports differential timing (7) selects, from the plurality of clock recovery modes, the adaptive clock recovery mode as the most optimal clock recovery mode by which to recover the service clock from the network clock based on (i) the determination that the type of optical network is the passive optical network, (ii) the determination that the type of service is the asynchronous T1 service and (iii) the determination that the optical network is untraceable, or the determination that the optical network does not support differential timing and (8) selects, from the plurality of clock recovery modes, the adaptive clock recovery mode as the most optimal clock recovery mode based by which to recover the service clock from the network clock on (i) the determination that the type of optical network is the active optical network, (ii) the determination that the type of service is the asynchronous T1 service and (iii) the determination that the optical network is untraceable or the determination that the optical network does not support differential timing.

29. The network system of claim 21, further comprising:
a protocol module that recovers a clock by which to deliver the determined type of service according to the automatically selected most optimal clock recovery mode by which to recover the service clock from the network clock; and
a Time Division Multiplexing module and a framer line interface unit that deliver the determined type of service in accordance with the recovered clock.

30. The network system of claim 21, wherein the clock mode selection module further determines whether the type of optical network is a Gigabit Passive Optical Network (GPON) or an Active Ethernet (AE) network.

31. A non-transitory computer-readable storage medium comprising instructions that cause a programmable processor to:
automatically determine, with an optical network terminal, a type of optical network to which the optical network terminal connects;
determine, with the optical network terminal, a type of service provided by the optical network terminal to one or more subscriber devices coupled to the optical network terminal; and
automatically select, with the optical network terminal, from a plurality of clock recovery modes, a clock recovery mode as a most optimal clock recovery mode by which to recover a service clock from a network clock, based on the determined type of optical network and the determined type of service.

32. The non-transitory computer-readable storage medium of claim 31,
wherein the instructions cause the programmable processor to further determine a traceability of the optical network, and
wherein the instructions cause the programmable processor to automatically select, from the plurality of clock recovery modes, the most optimal clock recovery mode by which to recover the service clock from the network clock by automatically selecting, with the optical network terminal, from the plurality of clock recovery modes, the most optimal clock recovery mode by which to recover the service clock from the network clock based on the determined type of optical network, the determined type of service and the determined traceability of the optical network.

33. The non-transitory computer-readable storage medium of claim 32,
wherein the instructions cause the programmable processor to further determine, in response to the determination that the optical network is traceable, whether the optical network supports differential timing, and
wherein the instructions cause the programmable processor to automatically select, from the plurality of clock recovery modes, the most optimal clock recovery mode by which to recover the service clock from the network clock by automatically selecting, with the optical network terminal, from the plurality of clock recovery modes, the most optimal clock recovery mode by which to recover the service clock from the network clock based on the determined type of optical network, the determined type of service, the determined traceability of the optical network, and the determined support of the differential timing within the optical network.

* * * * *